(12) United States Patent
Sakui et al.

(10) Patent No.: US 12,518,820 B2
(45) Date of Patent: *Jan. 6, 2026

(54) MEMORY DEVICE HAVING A MATRIX OF SGT MEMORY CELLS

(71) Applicant: Unisantis Electronics Singapore Pte. Ltd., Singapore (SG)

(72) Inventors: Koji Sakui, Tokyo (JP); Nozomu Harada, Tokyo (JP)

(73) Assignee: UNISANTIS ELECTRONICS SINGAPORE PTE. LTD., Singapore (SG)

( * ) Notice: Subject to any disclaimer, the term of this patent is extended or adjusted under 35 U.S.C. 154(b) by 311 days.

This patent is subject to a terminal disclaimer.

(21) Appl. No.: 18/229,049

(22) Filed: Aug. 1, 2023

(65) Prior Publication Data

US 2023/0410893 A1 Dec. 21, 2023

Related U.S. Application Data

(63) Continuation-in-part of application No. PCT/JP2021/003727, filed on Feb. 2, 2021.

(51) Int. Cl.
*G11C 11/404* (2006.01)
*G11C 11/4091* (2006.01)
(Continued)

(52) U.S. Cl.
CPC ...... *G11C 11/4096* (2013.01); *G11C 11/4091* (2013.01); *G11C 11/4094* (2013.01)

(58) Field of Classification Search
CPC .................................................. G11C 11/404
See application file for complete search history.

(56) References Cited

U.S. PATENT DOCUMENTS

| 5,453,955 A | 9/1995 | Sakui et al. |
| 7,525,141 B1 * | 4/2009 | Forbes ............... H10B 12/482 |
| | | 257/296 |

(Continued)

FOREIGN PATENT DOCUMENTS

| JP | H02188966 A | 7/1990 |
| JP | H03171768 A | 7/1991 |

(Continued)

OTHER PUBLICATIONS

Written Opinion of the International Searching Authority in International Application No. PCT/JP2021/003727, dated Mar. 30, 2021 (4 pages).

(Continued)

*Primary Examiner* — Mushfique Siddique
(74) *Attorney, Agent, or Firm* — Crowell & Moring LLP

(57) ABSTRACT

A semiconductor element memory device includes a first block including first memory cells arranged in a matrix, and/or a second block including second memory cells each formed of two memory cells. The memory device is configured to perform a data hold operation of controlling voltages to be applied to plate lines, word lines, a source line, odd-numbered bit lines, and even-numbered bit lines to hold, in a semiconductor base, a positive hole group generated by an impact ionization phenomenon or a gate-induced drain leakage current, and a data erase operation of controlling voltages to be applied to the plate lines, the word lines, the source line, the odd-numbered bit lines, and the even-numbered bit lines to discharge the positive hole group from the semiconductor base. The number of first blocks and the number of second blocks are variable in the memory device that is in operation.

11 Claims, 22 Drawing Sheets

(51) Int. Cl.
*G11C 11/4094* (2006.01)
*G11C 11/4096* (2006.01)

(56) References Cited

U.S. PATENT DOCUMENTS

| | | | | |
|---|---|---|---|---|
| 12,315,558 | B2* | 5/2025 | Sakui | G11C 11/4091 |
| 2006/0049444 | A1 | 3/2006 | Shino | |
| 2008/0212366 | A1 | 9/2008 | Ohsawa | |
| 2008/0239789 | A1* | 10/2008 | Shino | H10B 12/01 |
| | | | | 365/174 |
| 2016/0204251 | A1* | 7/2016 | Masuoka | H10D 84/0177 |
| | | | | 257/329 |
| 2017/0309632 | A1* | 10/2017 | Masuoka | H10D 84/038 |
| 2017/0330623 | A1* | 11/2017 | Kim | G11C 11/5628 |
| 2019/0066762 | A1* | 2/2019 | Koya | G11C 11/4087 |
| 2022/0367467 | A1* | 11/2022 | Harada | H10B 12/20 |
| 2022/0367474 | A1* | 11/2022 | Sakui | G11C 11/4091 |
| 2023/0282576 | A1* | 9/2023 | Yang | H10B 43/20 |
| 2023/0284433 | A1* | 9/2023 | Sakui | G11C 11/4096 |

FOREIGN PATENT DOCUMENTS

| | | |
|---|---|---|
| JP | 2006-80280 A | 3/2006 |
| JP | H3957774 | 5/2007 |
| JP | 2008-218556 A | 9/2008 |
| JP | 3210355 | 4/2017 |

OTHER PUBLICATIONS

Takato, H., et al., "Impact of Surrounding Gate Transistor (SGT) for Ultra-High-Density LSI's", *IEEE Transactions on Electron Devices*, vol. 38, No. 3, Mar. 1991, pp. 573-578 (6 pages).

Chung, H., et al., "Novel $4F^2$ DRAM Cell with Vertical Pillar Transistor(VPT)" *2011 Proceedings of the European Solid-State Device Research Conference* (2011) (4 pages).

Wong, H.S., P., et al., "Phase Change Memory" *Proceedings of the IEEE*, vol. 98, No. 12, Dec. 2010, pp. 2201-2227 (27 pages).

Tsunoda, K., et al., "Low Power and High Speed Switching of Ti-doped NiO ReRAM under the Unipolar Voltage Source of less than 3 V" IEDM (2007) pp. 767-770, (4 pages).

Kang, W., et al., "Reconfigurable Codesign of STT-MRAM Under Process Variations in Deeply Scaled Technology" *IEEE Transactions on Electron Devices*, vol. 62, No. 6, Jun. 2015, pp. 1769-1777 (9 pages).

Ertosuh, M. G., et al., "Novel Capacitorless Single-Transistor Charge-Trap DRAM 1T CT DRAM) Utilizing Electrons" *IEEE Electron Device Letters*, vol. 31, No. 5, May 2010, pp. 405-407 (3 pages).

Wan, J., et al., "A Compact Capacitor-Less High-Speed DRAM Using Field Effect—Controlled Charge Regeneration" *IEEE Electron Device Letters*, vol. 33, No. 2, Feb. 2012, pp. 179-181 (3 pages).

Ohsawa, T., et al., "Memory Design Using a One-Transistor Gain Cell on SOI", *IEEE Journal of Solid-State Circuits*, vol. 37, No. 11, Nov. 2022, pp. 1510-1522 (13 pages).

Shino, T., et al., "Floating Body RAM Technology and its Scalability to 32nm Node and Beyond", IEEE IEDM (2006) (4 pages).

Yoshida, E., et al., "A Design of a Capacitorless 1T-DRAM Cell Using Gate-induced Drain Leakage (GIDL) Current for Low-power and High-speed Embedded Memory" IEEE IEDM, pp. 913-916, Dec. 2003 (4 pages).

Song, J., et al., "Design Optimization of Gate-All-Around (GAA) MOSFETs" *IEEE Transactions on Nanotechnology*, vol. 5, No. 3, pp. 186-191, May 2006 (7 pages).

Loubet, N., et al., "Stacked Nanosheet Gate-All-Around Transistor to Enable Scaling Beyond FinFET" *2017 Symposium on VLSI Technology Digest of Technical Papers*, T230-T231, Jun. 2017 (2 pages).

Jiang, H., et al., "Experimental Investigation of Self-Heating Effect (SHE) in Multiple-Fin SOI FinFETS" *Semicond. Sci. Technol.* 29 (2014) 115021 (9 pages).

Yoshida, E., et al., "A Capacitorless 1T-DRAM Technology Using Gate-Induced Drain-Leakage (GIDL) Current for Low-Power and High-Speed Embedded Memory" *IEEE Transactions on Electron Devices*, vol. 53, No. 4, Apr. 2006 (6 pages).

Morishita, F., et al., "A Capacitorless Twin-Transistor Random Access Memory (TTRAM) on SOI" *IEICE Trans. Electron.*, vol. E90-C, No. 4, Apr. 2007, pp. 765-771 (7 pages).

\* cited by examiner

"1" WRITE OPERATION
SOURCE-SIDE IMPACT IONIZATION $$V_{FB}"1" = Vb - \beta_{WL} \times Vt_{WL}"1" - \beta_{BL} \times V_{BLH} \quad (7)$$
$$\underline{\text{SMALL}}$$

"1" WRITE STATE

"1" WRITE STATE

"0" ERASE OPERATION

FIG. 4B

ERASE OPERATION

| | SIGNAL LINE | APPLIED VOLTAGE |
|---|---|---|
| "0" ERASE | BIT LINE BL | $V_{SS}$ (e.g.: 0V) |
| | SOURCE LINE SL | $V_{ERA}$ (e.g.: -3V) |
| | PLATE LINE PL | $V_{PL}$ (e.g.: 2V) |
| | WORD LINE WL | $V_{SS}$ (e.g.: 0V) |
| | FLOATING BODY FB | $V_{ERA} + V_b$ (e.g.: -3V + 0.7V = -2.3V) |

$V_b$: BUILT-IN VOLTAGE OF PN JUNCTION 0.7 V

"1" WRITE STATE

"0" ERASE STATE

Vb: BUILT-IN VOLTAGE 0.7 V

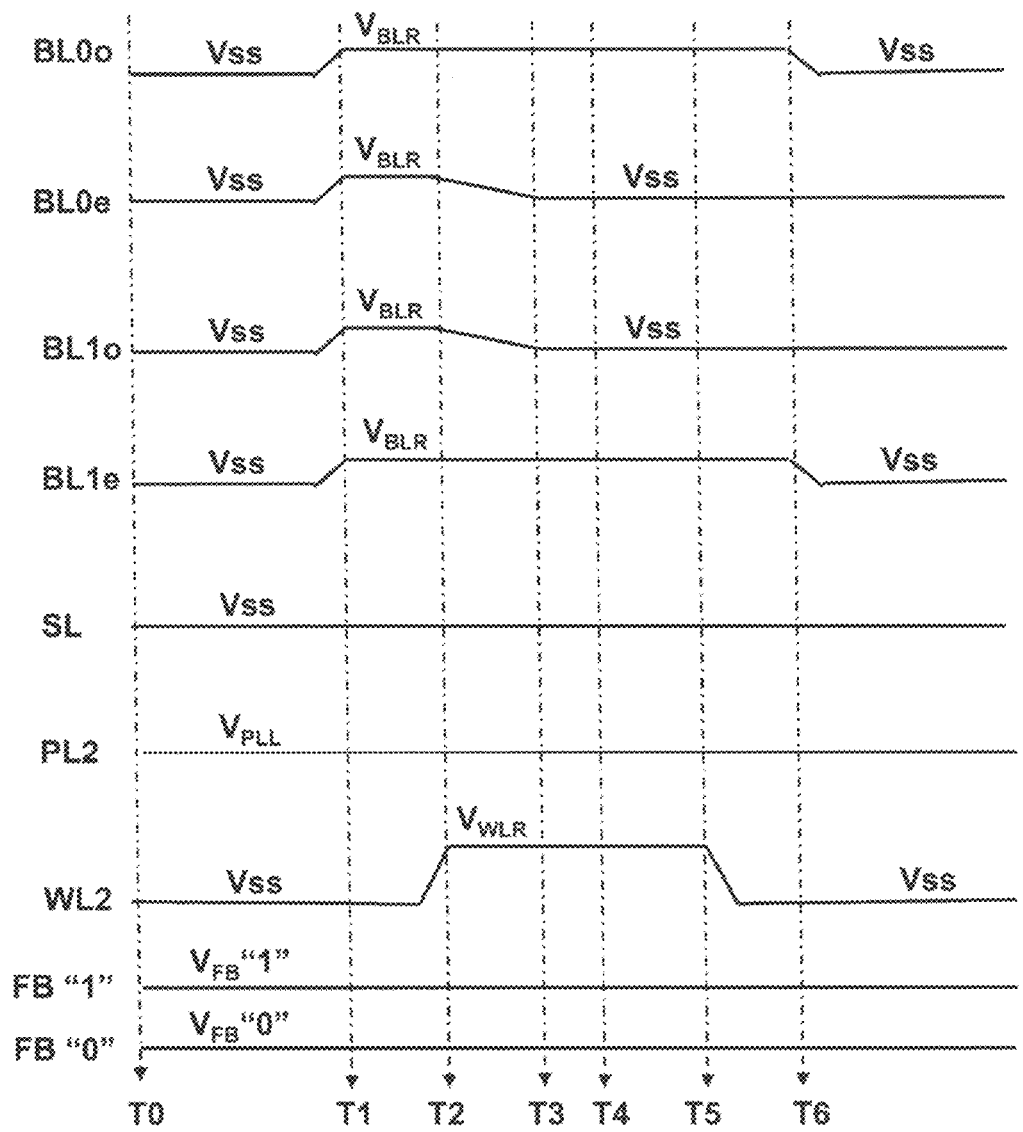

$$C_{FB} = C_{WL} + C_{BL} + C_{SL} \qquad (8)$$

$$\beta_{WL} = \frac{C_{WL}}{C_{WL} + C_{BL} + C_{SL}} \qquad (9)$$

$$\Delta V_{FB} = V_{FB2} - V_{FB1}$$
$$= \beta_{WL} \times V_{WLH} \qquad (10)$$

MEMORY DEVICE HAVING A MATRIX OF SGT MEMORY CELLS

CROSS REFERENCES TO RELATED APPLICATIONS

The present application is a Continuation-In-Part application of PCT/JP2021/003727, filed Feb. 2, 2021, the entire contents of which are incorporated herein by reference.

BACKGROUND OF THE INVENTION

1. Field of the Invention

The present invention relates to a semiconductor memory device including a semiconductor element.

2. Description of the Related Art

In recent years, a higher degree of integration and a higher performance of memory elements have been demanded in the development of the large scale integration (LSI) technology.

In a typical planar metal oxide semiconductor (MOS) transistor, a channel extends in a horizontal direction along an upper surface of a semiconductor substrate. In contrast, in a surrounding gate transistor (SGT), a channel extends in a vertical direction with respect to an upper surface of a semiconductor substrate (see, for example, Japanese Unexamined Patent Application Publication No. 2-188966; and Hiroshi Takato, Kazumasa Sunouchi, Naoko Okabe, Akihiro Nitayama, Katsuhiko Hieda, Fumio Horiguchi, and Fujio Masuoka: IEEE Transaction on Electron Devices, Vol. 38, No. 3, pp. 573-578 (1991)). Thus, compared with the planar MOS transistor, the SGT is capable of increasing the density of a semiconductor device. With use of the SGT as a selection transistor, a higher degree of integration can be achieved in a dynamic random access memory (DRAM) to which a capacitor is connected (see, for example, H. Chung, H. Kim, H. Kim, K. Kim, S. Kim, K. W. Song, J. Kim, Y. C. Oh, Y. Hwang, H. Hong, G. Jin, and C. Chung: "4F2 DRAM Cell with Vertical Pillar Transistor (VPT)," 2011 Proceeding of the European Solid-State Device Research Conference, (2011)), a phase change memory (PCM) to which a resistance change element is connected (see, for example, H. S. Philip Wong, S. Raoux, S. Kim, Jiale Liang, J. R. Reifenberg, B. Rajendran, M. Asheghi and K. E. Goodson: "Phase Change Memory," Proceeding of IEEE, Vol. 98, No. 12, December, pp. 2201-2227 (2010)), a resistive random access memory (RRAM) (see, for example, K. Tsunoda, K. Kinoshita, H. Noshiro, Y. Yamazaki, T. Iizuka, Y. Ito, A. Takahashi, A. Okano, Y. Sato, T. Fukano, M. Aoki, and Y. Sugiyama: "Low Power and High Speed Switching of Ti-doped NiO ReRAM under the Unipolar Voltage Source of less than 3 V," IEDM (2007)), a magneto-resistive random access memory (MRAM) in which a resistance is changed by changing the orientation of a magnetic spin by using a current (see, for example, W. Kang, L. Zhang, J. Klein, Y. Zhang, D. Ravelosona, and W. Zhao: "Reconfigurable Codesign of STT-MRAM Under Process Variations in Deeply Scaled Technology," IEEE Transaction on Electron Devices, pp. 1-9 (2015)), and so forth. In addition, there is a capacitorless DRAM memory cell constituted by a single MOS transistor (see J. Wan, L. Rojer, A. Zaslavsky, and S. Critoloveanu: "A Compact Capacitor-Less High-Speed DRAM Using Field Effect-Controlled Charge Regeneration," Electron Device Letters, Vol. 35, No. 2, pp. 179-181 (2012)). The present application relates to a dynamic flash memory that does not include a resistance change element or a capacitor and that can be constituted by a MOS transistor alone.

FIGS. 8A to 8D illustrate a write operation of the above-described capacitorless DRAM memory cell constituted by a single MOS transistor, FIGS. 9A and 9B illustrate a problem in the operation, and FIGS. 10A to 10C illustrate a read operation (see, for example, J. Wan, L. Rojer, A. Zaslavsky, and S. Critoloveanu: "A Compact Capacitor-Less High-Speed DRAM Using Field Effect-Controlled Charge Regeneration," Electron Device Letters, Vol. 35, No. 2, pp. 179-181 (2012); T. Ohsawa, K. Fujita, T. Higashi, Y. Iwata, T. Kajiyama, Y. Asao, and K. Sunouchi: "Memory design using a one-transistor gain cell on SOI," IEEE JSSC, vol. 37, No. 11, pp. 1510-1522 (2002); T. Shino, N. Kusunoki, T. Higashi, T. Ohsawa, K. Fujita, K. Hatsuda, N. Ikumi, F. Matsuoka, Y. Kajitani, R. Fukuda, Y. Watanabe, Y. Minami, A. Sakamoto, J. Nishimura, H. Nakajina, M. Morikado, K. Inoh, T. Hamamoto, A. Nitayama: "Floating Body RAM Technology and its Scalability to 32 nm Node and Beyond," IEEE IEDM (2006); and E. Yoshida and T. Tanaka: "A Design of Capacitorless 1T-DRAM Cell Using Gate-Induced Drain-Leakage (GIDL) Current for Low-Power and High-Speed Embedded Memory," IEEE IEDM (2006)). FIG. 8A illustrates a "1" write state. A memory cell 110 is formed on an SOI substrate 100 and is constituted by a source $N^+$ layer 103 (hereinafter, a semiconductor region containing donor impurities at high concentration will be referred to as an "$N^+$ layer") connected to a source line SL, a drain $N^+$ layer 104 connected to a bit line BL, a gate conductive layer 105 connected to a word line WL, and a floating body 102 of a MOS transistor. The single MOS transistor constitutes the DRAM memory cell 110 having no capacitor. A $SiO_2$ layer 101 of the SOI substrate 100 is immediately under the floating body 102 and is in contact with the floating body 102. To write "1" in the memory cell 110 constituted by the single MOS transistor, the MOS transistor is operated in a saturation region. That is, an electron channel 107 extending from the source $N^+$ layer 103 has a pinch-off point 108 and does not reach the drain $N^+$ layer 104 connected to the bit line BL. When the MOS transistor is operated such that the bit line BL connected to the drain $N^+$ layer 104 and the word line WL connected to the gate conductive layer 105 are both at a high voltage and that the gate voltage is about ½ of the drain voltage, the electric field strength becomes maximum at the pinch-off point 108 near the drain $N^+$ layer 104. As a result, accelerated electrons flowing from the source $N^+$ layer 103 toward the drain $N^+$ layer 104 collide with a Si lattice, and the kinetic energy lost at the time generates electron-hole pairs. Most of the generated electrons (not illustrated) reach the drain $N^+$ layer 104. A very small portion of the electrons, which is very hot, jumps over a gate oxide film 109 and reaches the gate conductive layer 105. Positive holes 106 generated simultaneously charge the floating body 102. In this case, the generated positive holes 106 contribute as an increment of a majority carrier because the floating body 102 is made of P-type Si. When the floating body 102 is filled with the generated positive holes 106 and the voltage of the floating body 102 becomes higher than that of the source $N^+$ layer 103 by Vb or more, positive holes further generated are discharged to the source $N^+$ layer 103. Vb herein is a built-in voltage of the PN junction between the source $N^+$ layer 103 and the floating body 102 as a P layer, and is about 0.7 V. FIG. 8B illustrates a state in which the floating body 102 is charged to saturation with the generated positive holes 106.

Next, a "0" write operation of the memory cell 110 will be described with reference to FIG. 8C. For a selected common word line WL, there are randomly a memory cell 110 for writing "1" and a memory cell 110 for writing "0". FIG. 8C illustrates a state of rewriting from a "1" write state to a "0" write state. To write "0", the voltage of the bit line BL is negatively biased, and the PN junction between the drain $N^+$ layer 104 and the floating body 102 as a P layer is forward biased. As a result, the positive holes 106 generated in the floating body 102 in advance in the previous cycle flow into the drain $N^+$ layer 104 connected to the bit line BL. Upon completion of the write operation, two memory cell states are obtained: the memory cell 110 filled with the generated positive holes 106 (FIG. 8B); and the memory cell 110 from which the generated positive holes 106 have been discharged (FIG. 8C). The floating body 102 of the memory cell 110 filled with the positive holes 106 has a potential higher than that of the floating body 102 having no generated positive holes. Thus, a threshold voltage of the memory cell 110 to write "1" is lower than a threshold voltage of the memory cell 110 to write "0". This state is illustrated in FIG. 8D.

Next, a problem in the operation of the memory cell 110 constituted by the single MOS transistor will be described with reference to FIGS. 9A and 9B. As illustrated in FIG. 9A, a capacitance $C_{FB}$ of the floating body 102 is the sum of a capacitance $C_{WL}$ between the gate connected to the word line and the floating body 102, a junction capacitance $C_{SL}$ of the PN junction between the source $N^+$ layer 103 connected to the source line and the floating body 102, and a junction capacitance $C_{BL}$ of the PN junction between the drain $N^+$ layer 104 connected to the bit line and the floating body 102, and is expressed as follows.

$$C_{FS} = C_{WL} + C_{BL} + C_{SL} \quad (8)$$

A capacitive coupling ratio $\beta_{WL}$ between the gate connected to the word line and the floating body 102 is expressed as follows.

$$\beta_{WL} = C_{WL}/(C_{WL} + C_{BL} + C_{SL}) \quad (9)$$

Thus, if a word line voltage $V_{WL}$ oscillates at the time of reading or writing, the oscillation affects the voltage of the floating body 102 serving as a storage node (contact point) of the memory cell. This state is illustrated in FIG. 9B. In accordance with an increase in the word line voltage $V_{WL}$ from 0 V to $V_{WLH}$ at the time of reading or writing, a voltage $V_{FB}$ of the floating body 102 increases from a voltage $V_{FB1}$ in an initial state before the word line voltage changes to a voltage $V_{FB2}$ due to capacitive coupling with the word line. The amount of voltage change $\Delta V_{FB}$ is expressed as follows.

$$\Delta V_{FS} = V_{FS2} - V_{FB1} = \beta_{WL} \times V_{WLH} \quad (10)$$

In $\beta_{WL}$ in equation (9), $C_{WL}$ has a high contribution ratio, for example, $C_{WL}:C_{BL}:C_{SL}=8:1:1$. In this case, $\beta$ equals 0.8. When the word line changes, for example, from 5 V at the time of writing to 0 V after the end of writing, the capacitive coupling between the word line WL and the floating body 102 causes the floating body 102 to be subjected to oscillation noise of 5 V×$\beta_{WL}$=4 V. This involves a problem that a sufficient potential difference margin is not provided between the "1" potential and the "0" potential of the floating body 102 at the time of writing.

FIGS. 10A to 10C illustrate a read operation, in which FIG. 10A illustrates a "1" write state, and FIG. 10B illustrates a "0" write state. Actually, however, even if Vb is written in the floating body 102 by "1" writing, the floating body 102 is lowered to a negative bias when the word line returns to 0 V upon completion of writing. "0" writing causes a deeper negative bias, and thus a sufficiently large potential difference margin between "1" and "0" is not obtained at the time of writing, as illustrated in FIG. 10C. Thus, it has been difficult to commercialize a capacitorless DRAM memory cell.

SUMMARY OF THE INVENTION

A capacitorless single-transistor DRAM (gain cell) has a problem that oscillation of the potential of the word line at the time of reading or writing data is directly transmitted as noise to the floating body because the capacitive coupling between the word line and the floating body is large. This results in a problem of erroneous reading or erroneous rewriting of stored data, and difficulty in putting a capacitorless single-transistor DRAM (gain cell) into practical use.

To solve the above problems, a semiconductor element memory device according to the present invention is
  a semiconductor element memory device including either or both of a first block and a second block,
  the first block including a plurality of first memory cells arranged in a matrix, each first memory cell being formed of one semiconductor element,
  the second block including a plurality of second memory cells arranged in a matrix, each second memory cell being formed of two semiconductor elements,
  each semiconductor element including:
  a semiconductor base standing on a substrate in a vertical direction with respect to the substrate or extending on the substrate in a horizontal direction with respect to the substrate;
  a first impurity region and a second impurity region at both ends of the semiconductor base;
  a gate insulating layer that is in contact with a side surface of the semiconductor base between the first impurity region and the second impurity region;
  a first gate conductor layer that covers a part or an entirety of the gate insulating layer; and
  a second gate conductor layer that is adjacent to the first gate conductor layer and that is in contact with a side surface of the gate insulating layer, wherein
  the semiconductor element memory device is configured to perform a memory write operation of controlling voltages to be applied to the first gate conductor layer, the second gate conductor layer, the first impurity region, and the second impurity region to hold, inside the semiconductor base, a positive hole group formed by an impact ionization phenomenon or a gate-induced drain leakage current and to cause the semiconductor base to have a first data retention voltage,
  the semiconductor element memory device is configured to perform a memory erase operation of controlling voltages to be applied to the first impurity region, the second impurity region, the first gate conductor layer, and the second gate conductor layer to discharge the positive hole group from either or both of the first impurity region and the second impurity region and to cause the semiconductor base to have a second data retention voltage lower than the first data retention voltage,
  in the first block, the first impurity region is connected to a source line, the second impurity region is connected to an odd-numbered bit line or an even-numbered bit line in an alternating manner, one of the first gate conductor layer and the second gate conductor layer is connected to a word line, an other of the first gate conductor layer and the second gate conductor layer is connected to a first drive control line, and the semiconductor element memory device is configured to, in accordance with voltages to be applied to the source line, the bit lines, the first drive control line, and the word line, fix one of the odd-numbered bit line and the even-numbered bit line to a first voltage and read data stored in the first memory cell through an other of the odd-numbered bit line and the even-numbered bit line, in the second block, the second memory cell includes an odd-numbered memory cell formed of a semiconductor element connected to the odd-numbered bit line and an even-numbered memory cell formed of a semiconductor element connected to the even-numbered bit line adjacent to the odd-numbered bit line, and the number of first blocks and the number of second blocks are variable in the semiconductor element memory device that is in operation (first invention).

In the above-described first invention, data stored in each first memory cell is read to the odd-numbered bit line or the even-numbered bit line, and whether the data is write data or erase data is determined by a sense amplifier circuit in accordance with which of the odd-numbered bit line and the even-numbered bit line is a bit line to which the data has been read (second invention).

In the above-described first invention, the first voltage is a ground voltage (third invention).

In the above-described first invention, the odd-numbered bit line and the even-numbered bit line adjacent to the odd-numbered bit line share a single sense amplifier circuit (fourth invention).

In the above-described first invention, the memory write operation of the first memory cell is performed by selecting either the odd-numbered bit line or the even-numbered bit line (fifth invention).

In the above-described first invention, the memory write operation of the first memory cell is performed by fixing one of the odd-numbered bit line and the even-numbered bit line to a second voltage and selecting an other of the odd-numbered bit line and the even-numbered bit line (sixth invention).

In the above-described first invention, in the memory write operation of the second memory cell, one of the semiconductor base of the odd-numbered memory cell and the semiconductor base of the even-numbered memory cell has the first data retention voltage, and an other of the semiconductor base of the odd-numbered memory cell and the semiconductor base of the even-numbered memory cell has the second data retention voltage (seventh invention).

In the above-described first invention, the second memory cell has a capacity of one bit (eighth invention).

In the above-described first invention, a first gate capacitance between the first gate conductor layer and the semiconductor base is larger than a second gate capacitance between the second gate conductor layer and the semiconductor base (ninth invention).

In the above-described first invention, either or both of the first gate conductor layer and the second gate conductor layer are divided into two or more isolated gate conductor layers in plan view or in the vertical direction, and the isolated gate conductor layers are operated synchronously or asynchronously (tenth invention).

In the above-described tenth invention, in the vertical direction, the isolated gate conductor layers of one of the first gate conductor layer and the second gate conductor layer are disposed on both sides of an other of the first gate conductor layer and the second gate conductor layer (eleventh invention).

BRIEF DESCRIPTION OF THE DRAWINGS

FIG. 4B is diagram for describing an erase operation mechanism of the memory device including an SGT according to the first embodiment;

FIG. 7H is a diagram for describing the high-speed dynamic flash memory cell technique according to the first embodiment;

DESCRIPTION OF THE PREFERRED EMBODIMENTS

Hereinafter, a semiconductor element memory device (hereinafter referred to as a dynamic flash memory) according to the present invention will be described with reference to the drawings.

First Embodiment

Figure 1:
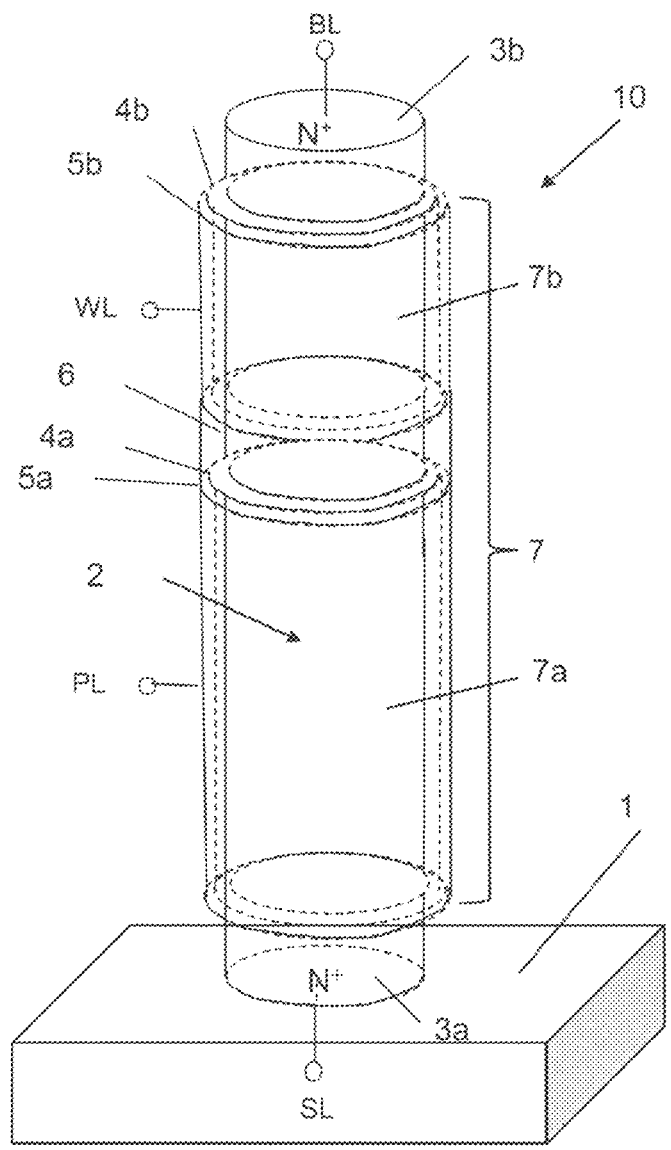
FIG. 1 is a structural diagram of a memory device including an SGT according to a first embodiment.
Figure 2A:
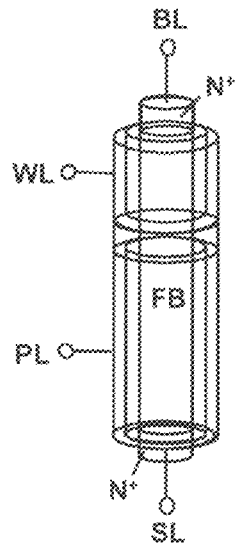
FIGS. 2A, 2B, and 2C are diagrams for describing an effect obtained when the gate capacitance of a first gate conductor layer connected to a plate line is larger than the gate capacitance of a second gate conductor layer connected to a word line in the memory device including an SGT according to the first embodiment.
Figure 2B:
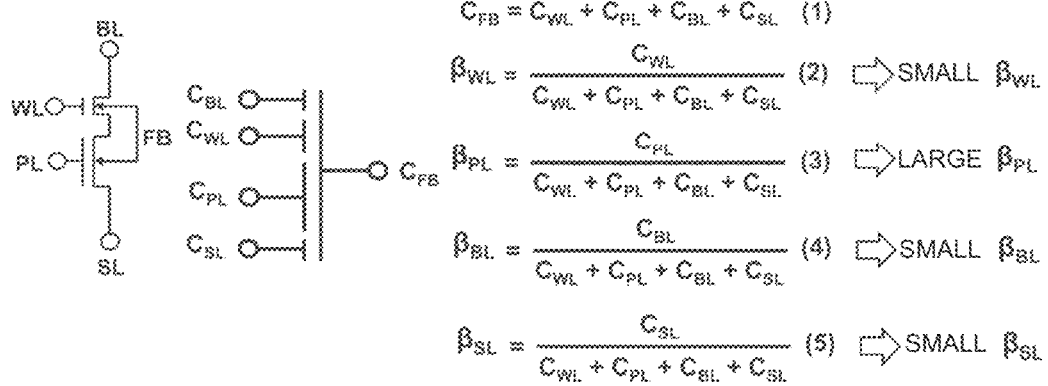
Figure 2C:
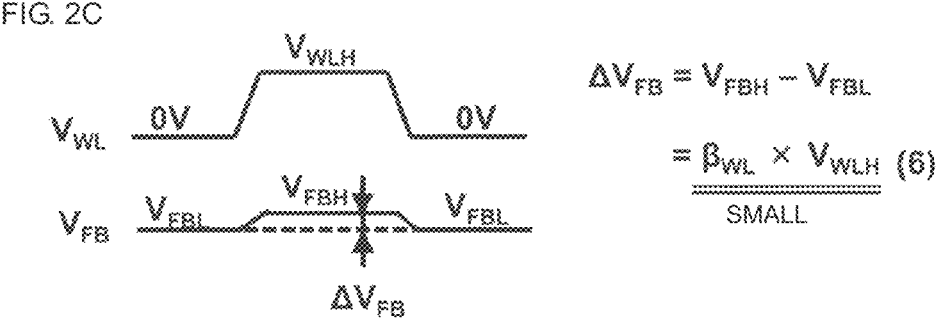
Figure 4A:
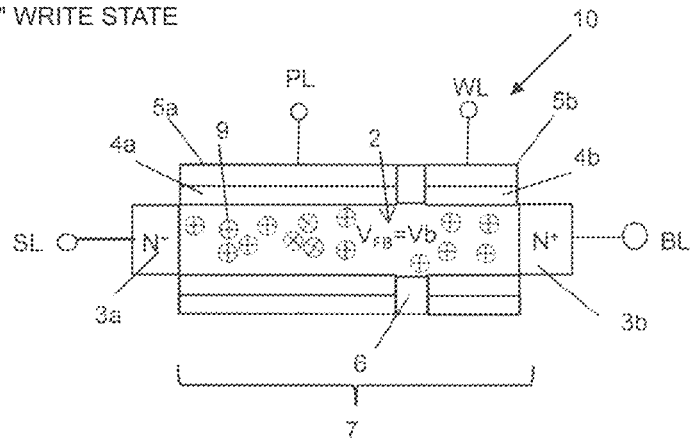
FIGS. 4AA, 4AB, and 4AC are diagrams for describing an erase operation mechanism of the memory device including an SGT according to the first embodiment.
Figure 4A:
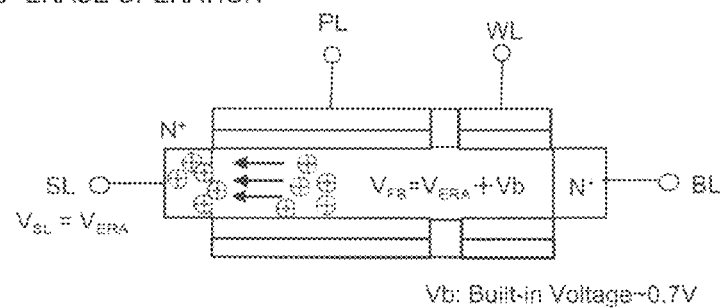
Figure 4A:
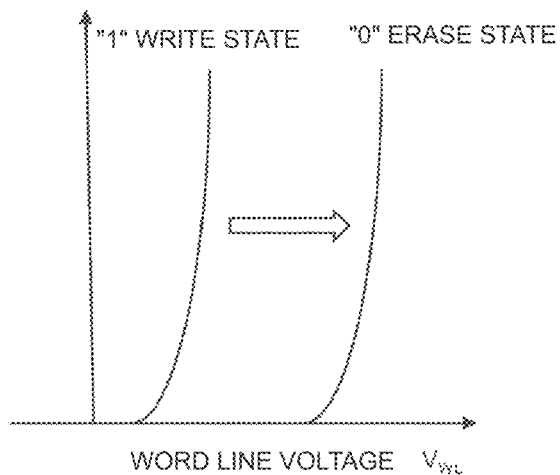
Figure 5A:
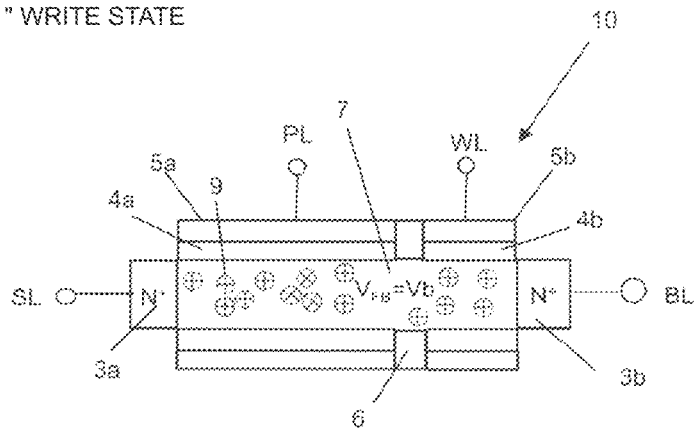
FIGS. 5A, 5B, and 5C are diagrams for describing a read operation mechanism of the memory device including an SGT according to the first embodiment.
Figure 5B:
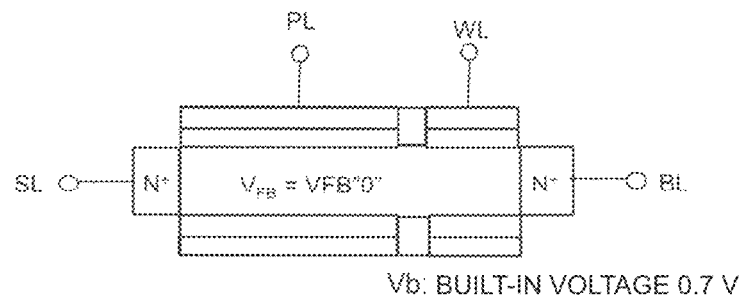
Figure 5C:
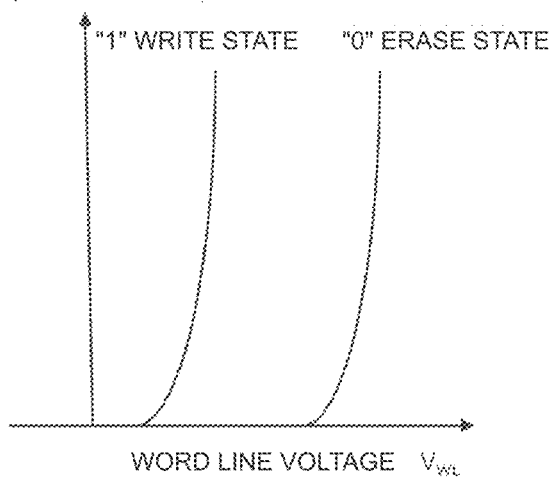

The structure and operation mechanism of a dynamic flash memory cell according to a first embodiment of the present invention will be described with reference to FIG. 1, FIGS. 2A to 2C, FIGS. 3A to 3D, FIGS. 4AA to 4AC, FIG. 4B, and FIGS. 5A to 5C. With reference to FIG. 1, a description will be given of the structure of the dynamic flash memory cell. With reference to FIGS. 2A to 2C, a description will be given of an effect obtained when the gate capacitance of a first gate conductor layer 5a connected to a plate line PL is larger than the gate capacitance of a second gate conductor layer 5b connected to a word line WL. With reference to FIGS. 3A to 3D, a description will be given of a data write operation mechanism. With reference to FIGS. 4AA to 4AC and FIG. 4B, a description will be given of a data erase operation mechanism. With reference to FIGS. 5A to 5C, a description will be given of a data read operation mechanism.

FIG. 1 illustrates the structure of the dynamic flash memory cell according to the first embodiment of the present invention. At lower and upper positions in a silicon semiconductor pillar 2 (an example of "semiconductor base" in the claims, hereinafter a silicon semiconductor pillar will be referred to as a "Si pillar") having a conductivity type of P type or i type (intrinsic type) and formed on a substrate 1 (an example of "substrate" in the claims), an N$^+$ layer 3a (an example of "first impurity region" in the claims) and an N$^+$ layer 3b (an example of "second impurity region" in the claims) are formed, one of which serves as a source and the other of which serves as a drain. A portion of the Si pillar 2 between the N$^+$ layers 3a and 3b serving as the source and drain is a semiconductor base 7 (an example of "semiconductor base" in the claims). A first gate insulating layer 4a (an example of "gate insulating layer" in the claims) and a second gate insulating layer 4b (an example of "gate insulating layer" in the claims) are formed so as to surround the semiconductor base 7. The first gate insulating layer 4a and the second gate insulating layer 4b are respectively in contact with or close to the N$^+$ layer 3a and the N$^+$ layer 3b serving as the source and drain. A first gate conductor layer 5a (an example of "first gate conductor layer" in the claims) and a second gate conductor layer 5b (an example of "second gate conductor layer" in the claims) are formed so as to respectively surround the first gate insulating layer 4a and the second gate insulating layer 4b. The first gate conductor layer 5a and the second gate conductor layer 5b are isolated from each other by an insulating layer 6. The semiconductor base 7, which is a portion of the Si pillar 2 between the N$^+$ layers 3a and 3b, is formed of a first channel Si layer 7a surrounded by the first gate insulating layer 4a and a second channel Si layer 7b surrounded by the second gate insulating layer 4b. Accordingly, a dynamic flash memory cell 10 formed of the N$^+$ layers 3a and 3b serving as the source and drain, the semiconductor base 7, the first gate insulating layer 4a, the second gate insulating layer 4b, the first gate conductor layer 5a, and the second gate conductor layer 5b is formed. The N$^+$ layer 3a serving as the source is connected to a source line SL (an example of "source line" in the claims), the N$^+$ layer 3b serving as the drain is connected to a bit line BL (an example of "bit line" in the claims), the first gate conductor layer 5a is connected to a plate line PL serving as a first drive control line (an example of "first drive control line" in the claims), and the second gate conductor layer 5b is connected to a word line WL (an example of "word line" in the claims). In a desired structure, the gate capacitance of the first gate conductor layer 5a connected to the plate line PL is larger than the gate capacitance of the second gate conductor layer 5b connected to the word line WL.

In FIG. 1, the gate length of the first gate conductor layer 5a is made larger than the gate length of the second gate conductor layer 5b so that the gate capacitance of the first gate conductor layer 5a connected to the plate line PL is larger than the gate capacitance of the second gate conductor layer 5b connected to the word line WL. Alternatively, instead of making the gate length of the first gate conductor layer 5a larger than the gate length of the second gate conductor layer 5b, the gate insulating film of the first gate insulating layer 4a may be made thinner than the gate insulating film of the second gate insulating layer 4b by changing the film thicknesses of the respective gate insulating layers. Alternatively, the permittivity of the gate insulating film of the first gate insulating layer 4a may be made higher than the permittivity of the gate insulating film of the second gate insulating layer 4b by changing the permittivities of the materials of the respective gate insulating layers. The gate capacitance of the first gate conductor layer 5a connected to the plate line PL may be made larger than the gate capacitance of the second gate conductor layer 5b connected to the word line WL by combining the lengths of the gate conductor layers 5a and 5b and the film thicknesses or permittivities of the gate insulating layers 4a and 4b.

FIGS. 2A to 2C are diagrams for describing an effect obtained when the gate capacitance of the first gate conductor layer 5a connected to the plate line PL is larger than the gate capacitance of the second gate conductor layer 5b connected to the word line WL.

FIG. 2A schematically illustrates only a main part of the structure of the dynamic flash memory cell according to the first embodiment of the present invention. The bit line BL, the word line WL, the plate line PL, and the source line SL are connected to the dynamic flash memory cell, and the voltage state thereof determines the potential state of the semiconductor base 7.

FIG. 2B is a diagram for describing the respective capacitance relationships. A capacitance $C_{FB}$ of the semiconductor base 7 is the sum of a capacitance $C_{WL}$ between the second gate conductor layer 5b connected to the word line WL and the semiconductor base 7, a capacitance $C_{PL}$ between the first gate conductor layer 5a connected to the plate line PL and the semiconductor base 7, a junction capacitance $C_{SL}$ of the PN junction between the N$^+$ layer 3a connected to the source line SL and the semiconductor base 7, and a junction capacitance $C_{BL}$ of the PN junction between the N⁺ layer 3b connected to the bit line BL and the semiconductor base 7, and is expressed as follows.

$$C_{FB}=C_{WL}+C_{PL}+C_{BL}+C_{SL} \quad (1)$$

Thus, a coupling ratio $\beta_{WL}$ between the word line WL and the semiconductor base 7, a coupling ratio $\beta_{PL}$ between the plate line PL and the semiconductor base 7, a coupling ratio $\beta_{BL}$ between the bit line BL and the semiconductor base 7, and a coupling ratio $\beta_{SL}$ between the source line SL and the semiconductor base 7 are expressed as follows.

$$\beta_{WL}=C_{WL}/(C_{WL}+C_{PL}+C_{BL}+C_{SL}) \quad (2)$$

$$\beta_{PL}=C_{PL}/(C_{WL}+C_{PL}+C_{BL}+C_{SL}) \quad (3)$$

$$\beta_{BL}=C_{BL}/(C_{WL}+C_{PL}+C_{BL}+C_{SL}) \quad (4)$$

$$\beta_{SL}=C_{SL}/(C_{WL}+C_{PL}+C_{BL}+C_{SL}) \quad (5)$$

Here, $C_{PL}>C_{WL}$ holds, and thus $\beta_{PL}>\beta_{WL}$ holds.

FIG. 2C is a diagram for describing a change in a voltage $V_{FB}$ of the semiconductor base 7 when a voltage $V_{WL}$ of the word line WL rises and then drops in a read operation and a write operation. Here, when the voltage $V_{WL}$ of the word line WL rises from 0 V to a high voltage state $V_{WLH}$, a potential difference $\Delta V_{FB}$ between a low voltage state $V_{FBL}$ and a high voltage state $V_{FBH}$ of the voltage $V_{FB}$ of the semiconductor base 7 is expressed as follows.

$$\Delta V_{FB}=V_{FBH}-V_{FBL}=\beta_{WL}\times V_{WLH} \quad (6)$$

The coupling ratio $\beta_{WL}$ between the word line WL and the semiconductor base 7 is small and the coupling ratio $\beta_{PL}$ between the plate line PL and the semiconductor base 7 is large. Thus, $\Delta V_{FB}$ is small, and the voltage $V_{FB}$ of the semiconductor base 7 hardly changes even if the voltage $V_{WL}$ of the word line WL rises and drops in a read operation and a write operation.

Figure 3A:
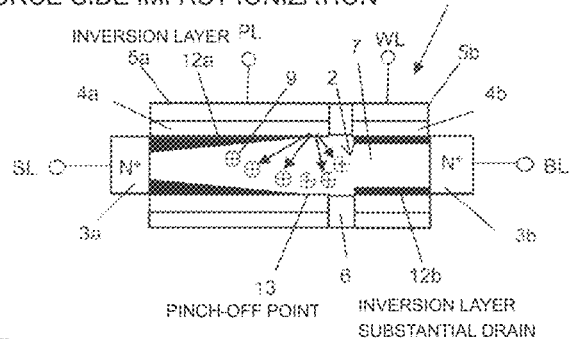
FIGS. 3A, 3B, 3C, and 3D are diagrams for describing a write operation mechanism of the memory device including an SGT according to the first embodiment.
Figure 3B:
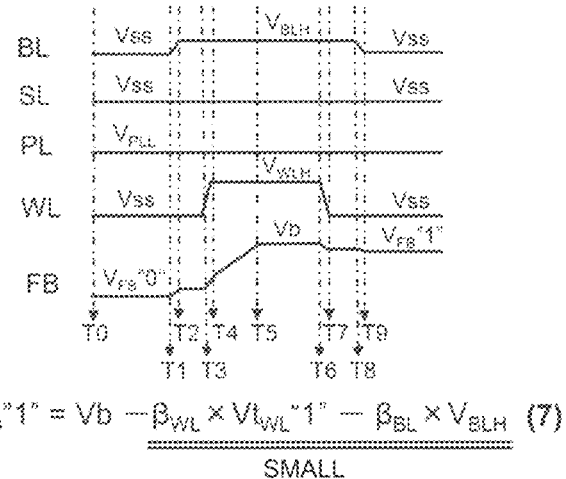

FIGS. 3A to 3D illustrate a write operation of the dynamic flash memory cell according to the first embodiment of the present invention. FIG. 3A illustrates a mechanism of a write operation, and FIG. 3B illustrates operation waveforms of the bit line BL, the source line SL, the plate line PL, the word line WL, and the semiconductor base 7 serving as a floating body FB. At time T0, the dynamic flash memory cell is in a "0" erase state, and the voltage of the semiconductor base 7 is $V_{FB}$ "0". A voltage Vss is applied to the bit line BL, the source line SL, and the word line WL, whereas a voltage $V_{PLL}$ is applied to the plate line PL. Here, for example, the voltage Vss is 0 V and the voltage $V_{PLL}$ is 2 V. When the voltage of the bit line BL rises from Vss to $V_{BLH}$ from time T1 to time T2, for example, in a case where the voltage Vss is 0 V, the voltage of the semiconductor base 7 becomes $V_{FB}$ "0"+$\beta_{BL}\times V_{BLH}$ due to the capacitive coupling between the bit line BL and the semiconductor base 7.

The write operation of the dynamic flash memory cell will be further described with reference to FIGS. 3A and 3B. From time T3 to time T4, the voltage of the word line WL rises from Vss to $V_{WLH}$. Accordingly, when a "0" erase threshold voltage $Vt_{WL}$ of a second N-channel MOS transistor region in which the second gate conductor layer 5b connected to the word line WL surrounds the semiconductor base 7 is "0", the voltage of the semiconductor base 7 becomes $V_{FB}$ "0"+$\beta_{BL}\times V_{BLH}$+$\beta_{WL}\times Vt_{WL}$ "0" due to the capacitive coupling between the word line WL and the semiconductor base 7 from Vss to $Vt_{WL}$ "0" as the voltage of the word line WL rises. When the voltage of the word line WL rises to $Vt_{WL}$ "0" or more, an annular inversion layer 12b is formed in the semiconductor base 7 on an inner side from the second gate conductor layer 5b, interrupting second capacitive coupling between the word line WL and the semiconductor base 7.

The write operation of the dynamic flash memory cell will be further described with reference to FIGS. 3A and 3B. From time T3 to time T4, for example, $V_{PLL}=2$ V is fixedly input to the first gate conductor layer 5a connected to the plate line PL, and the voltage of the second gate conductor layer 5b connected to the word line WL rises to, for example, $V_{WLH}=4$ V. As a result, as illustrated in FIG. 3A, an annular inversion layer 12a is formed in the semiconductor base 7 on an inner side from the first gate conductor layer 5a connected to the plate line PL. The inversion layer 12a has a pinch-off point 13. As a result, a first N-channel MOS transistor region including the first gate conductor layer 5a operates in a saturation region. On the other hand, the second N-channel MOS transistor region including the second gate conductor layer 5b connected to the word line WL operates in a linear region. As a result, a pinch-off point is absent on an inner side from the second gate conductor layer 5b connected to the word line WL, and the inversion layer 12b is formed over the entire surface. The inversion layer 12b formed over the entire surface on the inner side from the second gate conductor layer 5b connected to the word line WL substantially functions as the drain of the second N-channel MOS transistor region including the second gate conductor layer 5b. As a result, the electric field becomes maximum in a first boundary region of the semiconductor base 7 between the first N-channel MOS transistor region including the first gate conductor layer 5a and the second N-channel MOS transistor region including the second gate conductor layer 5b that are connected in series, and an impact ionization phenomenon occurs in this region. This region is a region on the source side when viewed from the second N-channel MOS transistor region including the second gate conductor layer 5b connected to the word line WL, and thus this phenomenon is referred to as a source-side impact ionization phenomenon. The source-side impact ionization phenomenon causes electrons to flow from the N⁺ layer 3a connected to the source line SL toward the N⁺ layer 3b connected to the bit line BL. Accelerated electrons collide with lattice Si atoms, and the kinetic energy thereof generates electron-hole pairs. Some of the generated electrons flow to the first gate conductor layer 5a and the second gate conductor layer 5b, but most of the electrons flow to the N⁺ layer 3b connected to the bit line BL (not illustrated).

Figure 3C:
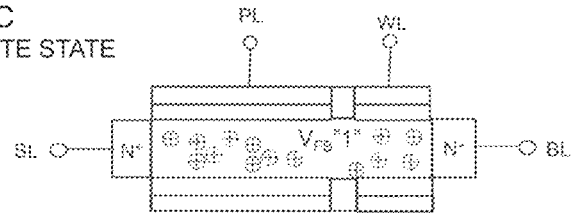

As illustrated in FIG. 3C, a generated positive hole group 9 (an example of "positive hole group" in the claims) is a majority carrier in the semiconductor base 7 and charges the semiconductor base 7 to a positive bias. The N⁺ layer 3a connected to the source line SL is at 0 V, and thus the semiconductor base 7 is charged to a built-in voltage Vb (about 0.7 V) of the PN junction between the N⁺ layer 3a connected to the source line SL and the semiconductor base 7. Upon the semiconductor base 7 being charged to a positive bias, the threshold voltages of the first N-channel MOS transistor region and the second N-channel MOS transistor region are decreased by a substrate bias effect.

The write operation of the dynamic flash memory cell will be further described with reference to FIG. 3B. From time T6 to time T7, the voltage of the word line WL drops from $V_{WLH}$ to Vss. At this time, second capacitive coupling occurs between the word line WL and the semiconductor base 7, but the inversion layer 12b blocks the second capacitive coupling until the voltage $V_{WLH}$ of the word line WL becomes equal to or lower than the threshold voltage $Vt_{WL}$ "1" of the second N-channel MOS transistor region when the voltage of the semiconductor base 7 is Vb. Thus, the substantial capacitive coupling between the word line WL and the semiconductor base 7 occurs only when the voltage of the word line WL becomes equal to or lower than $Vt_{WL}$ "1" and drops to Vss. As a result, the voltage of the semiconductor base 7 becomes Vb−$\beta_{WL}$×$Vt_{WL}$ "1". Here, $Vt_{WL}$ "1" is lower than $Vt_{WL}$ "0", and $\beta_{WL}$×$Vt_{WL}$ "1" is small.

The write operation of the dynamic flash memory cell will be further described with reference to FIG. 3B. From time T8 to time T9, the voltage of the bit line BL drops from $V_{BL}$ to Vss. Because the bit line BL and the semiconductor base 7 are capacitively coupled to each other, the "1" write voltage $V_{FB}$ "1" of the semiconductor base 7 finally becomes the following.

$$V_{FB}\text{"1"}=Vb-\beta_{WL}\times Vt_{WL}\text{"1"}-\beta_{BL}\times V_{BLH} \quad (7)$$

Figure 3D:
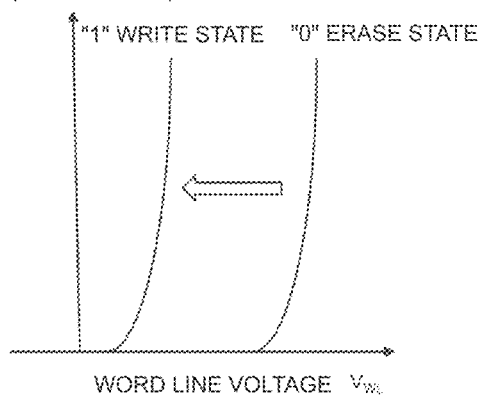

Here, the coupling ratio $\beta_{BL}$ between the bit line BL and the semiconductor base 7 is also small. Accordingly, as illustrated in FIG. 3D, the threshold voltage of the second N-channel MOS transistor region of the second channel Si layer 7b connected to the word line WL decreases. A memory write operation (an example of "memory write operation" in the claims) is performed with the "1" write state of the semiconductor base 7 being a first data retention voltage (an example of "first data retention voltage" in the claims), and is assigned to logical storage data "1".

At the time of the write operation, in a second boundary region between the first impurity region 3a and the first channel Si layer 7a or a third boundary region between the second impurity region 3b and the second channel Si layer 7b instead of the first boundary region, electron-hole pairs may be generated by an impact ionization phenomenon, and the semiconductor base 7 may be charged with the generated positive hole group 9.

The above-described conditions of the voltages applied to the bit line BL, the source line SL, the word line WL, and the plate line PL are examples for performing a write operation. Other operation conditions for performing a write operation may be used.

The mechanism of a memory erase operation (an example of "memory erase operation" in the claims) will be described with reference to FIGS. 4AA to 4AC and FIG. 4B. The semiconductor base 7 between the N+ layers 3a and 3b is electrically isolated from the substrate 1 and serves as a floating body. FIG. 4AA illustrates a state in which the positive hole group 9 generated by a gate-induced drain leakage current in the previous cycle is stored in the semiconductor base 7 before an erase operation. As illustrated in FIG. 4AB, the voltage of the source line SL is set to a negative voltage $V_{ERA}$ at the time of the erase operation. Here, $V_{ERA}$ is −3 V, for example. As a result, the PN junction between the semiconductor base 7 and the N+ layer 3a serving as the source connected to the source line SL is forward biased, regardless of the value of an initial potential of the semiconductor base 7. As a result, the positive hole group 9 generated by a gate-induced drain leakage current in the previous cycle and stored in the semiconductor base 7 is absorbed into the N+ layer 3a serving as the source, and the voltage $V_{FB}$ of the semiconductor base 7 becomes $V_{FB}=V_{ERA}$+Vb. This voltage value is a second data retention voltage (an example of "second data retention voltage" in the claims). Here, Vb is a built-in voltage of the PN junction and is about 0.7 V. Thus, when $V_{EPA}$=−3 V holds, the potential of the semiconductor base 7 is −2.3 V. This value corresponds to the potential state of the semiconductor base 7 in an erase state. Thus, when the potential of the semiconductor base 7 of the floating body becomes a negative voltage, the threshold voltage of the N-channel MOS transistor region increases due to a substrate bias effect.

Accordingly, the threshold voltage of the second gate conductor layer 5b connected to the word line WL increases as illustrated in FIG. 4AC. The erase state in the semiconductor base 7 corresponds to logical storage data "0". In data reading, the voltage to be applied to the first gate conductor layer 5a connected to the plate line PL is set to be higher than the threshold voltage at the time of logical storage data "1" and lower than the threshold voltage at the time of logical storage data "0", and thereby a characteristic is obtained in which no current flows even if the voltage of the word line WL is increased. FIG. 4B illustrates an example of voltage conditions of individual main node contacts at the time of the above-described erase operation. Upon the memory erase operation being finished, the source line SL returns to 0 V. As a result, the first PN junction and the second PN junction are both reverse-biased, and the voltage $V_{FB}$ of the semiconductor base 7 is retained.

The above-described conditions of the voltages applied to the bit line BL, the source line SL, the word line WL, and the plate line PL are examples for performing an erase operation, and other operation conditions for performing the erase operation may be used.

FIGS. 5A to 5C are diagrams for describing a read operation of the dynamic flash memory cell according to the first embodiment of the present invention. As illustrated in FIG. 5A, upon the semiconductor base 7 being charged to the built-in voltage Vb (about 0.7 V), the threshold voltage of the second N-channel MOS transistor region including the second gate conductor layer 5b connected to the word line WL is decreased by a substrate bias effect. This state is assigned to logical storage data "1". As illustrated in FIG. 5B, the memory block selected before writing is in an erase state "0" in advance, and the voltage $V_{FB}$ of the semiconductor base 7 is $V_{FB}$ "0". A write operation causes a write state "1" to be randomly stored. As a result, logical storage data of the logic "0" and "1" is generated for the word line WL. As illustrated in FIG. 5C, reading is performed by a sense amplifier by using a difference between two threshold voltages for the word line WL.

The above-described conditions of the voltages applied to the bit line BL, the source line SL, the word line WL, and the plate line PL are examples for performing a read operation, and other operation conditions for performing the read operation may be used.

Figure 6A:
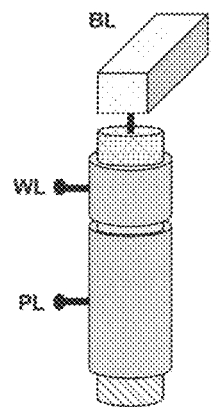
FIGS. 6AA, 6AB, and 6AC are diagrams for describing a bit line shield technique of the memory device including an SGT according to the first embodiment.
Figure 6A:
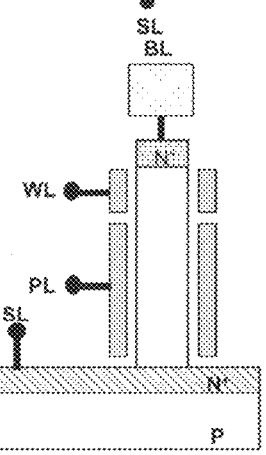
Figure 6A:
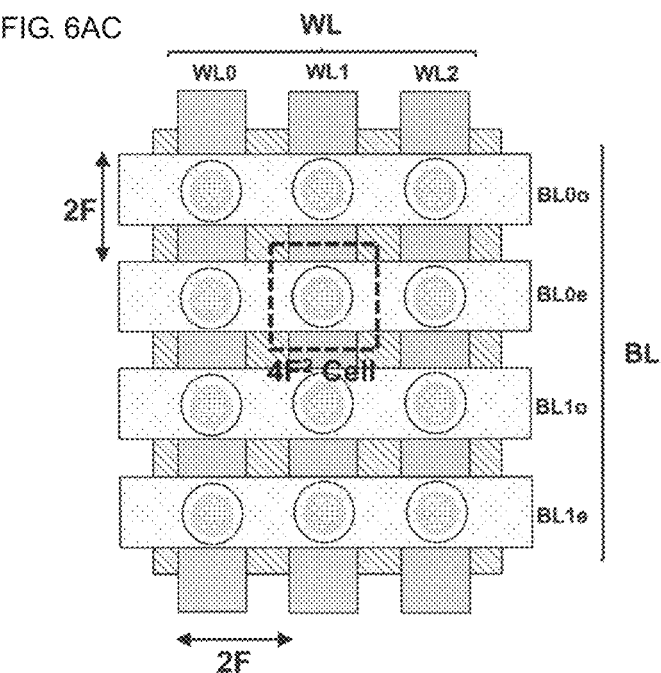
Figure 6B:
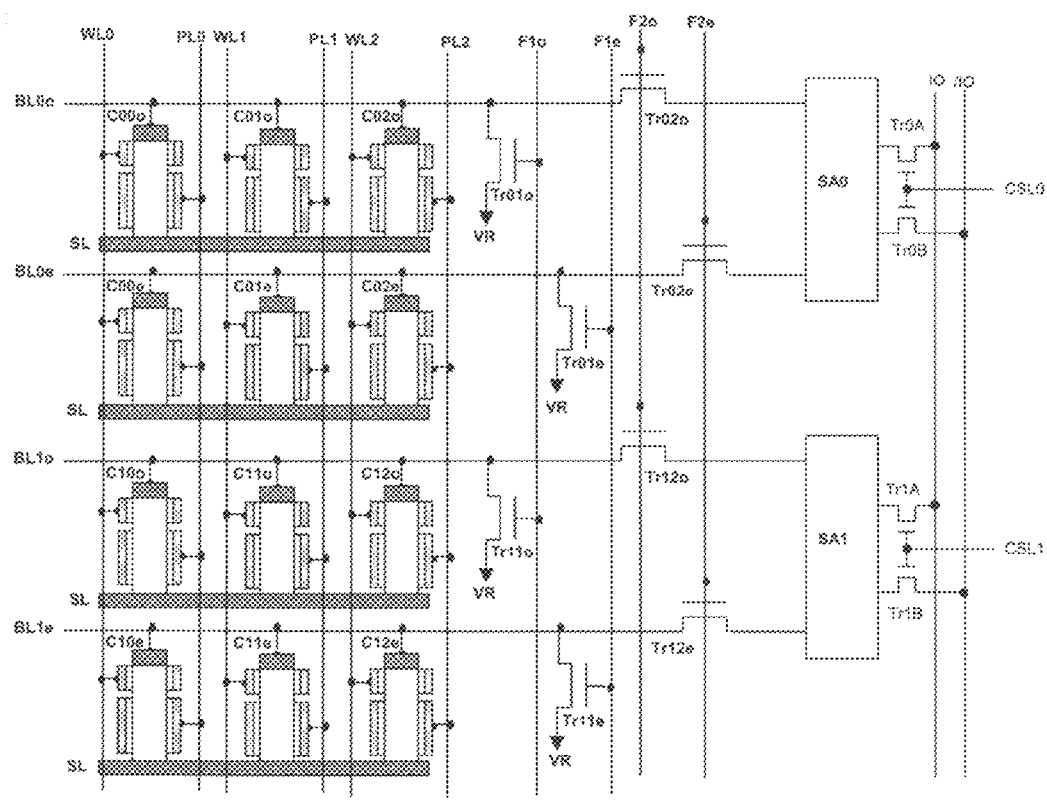
FIG. 6B is a diagram for describing the bit line shield technique of the memory device including an SGT according to the first embodiment.
Figure 6C:
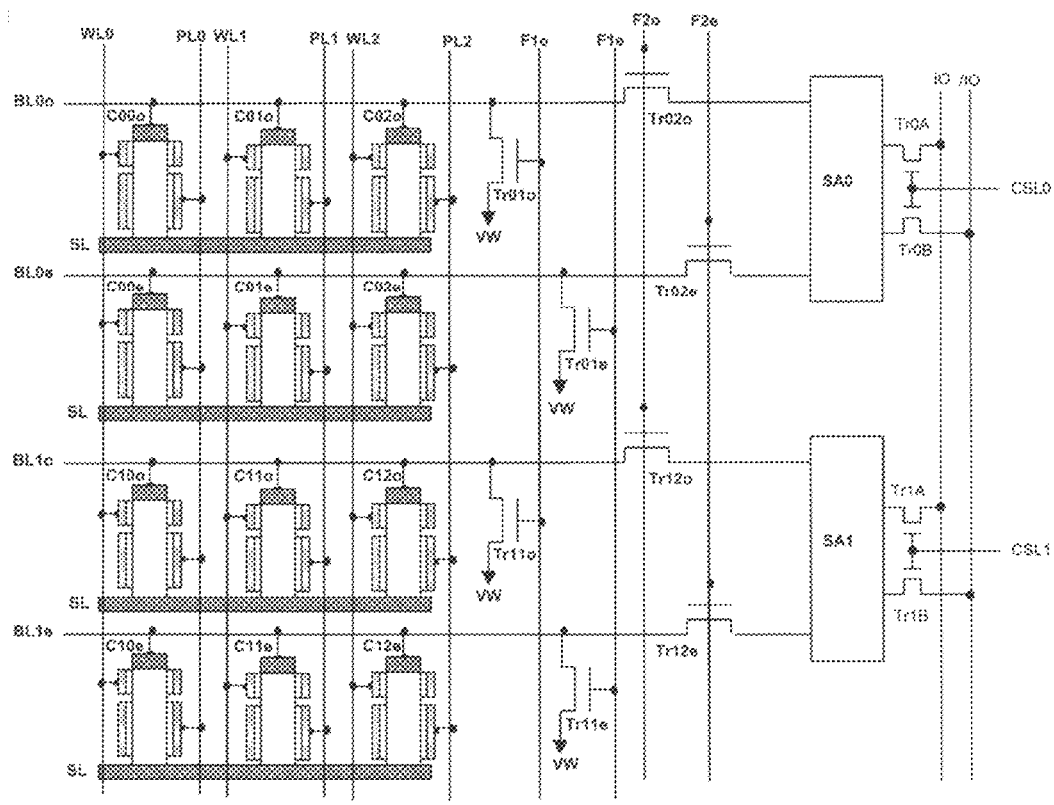
FIG. 6C is a diagram for describing a memory array of the memory device including an SGT according to the first embodiment.

FIGS. 6AA to 6AC, FIG. 6B, and FIG. 6C are diagrams for describing a bit line shield technique for the dynamic flash memory cell according to the first embodiment of the present invention.

FIGS. 6AA and 6AB are a bird's-eye view and a sectional view, respectively, of a dynamic flash memory cell, which is a one-bit first memory cell (an example of "first memory cell" in the claims) formed of a single semiconductor base. In FIGS. 6AA and 6AB, a bit line BL, a source line SL, a plate line PL, and a word line WL are connected to the dynamic flash memory cell. FIG. 6AC is a plan view of a first block (an example of "first block" in the claims) in which a plurality of (3×4) dynamic flash memory cells are arranged in a matrix (an example of "matrix" in the claims). The dynamic flash memory cells can be arranged with a pitch 2F of bit lines BL and a pitch 2F of word lines WL, and with a one-bit memory cell size of 2F×2F=4F². Here, F is referred to as a ground rule or a design rule (F: feature size). For example, F=15 nm in a miniaturized dynamic flash memory cell. As a result, at the time of reading a memory cell in a "1" write state and a memory cell in a "0" erase state, the capacitive coupling between adjacent bit lines BL is large, and it is necessary to devise a reading method. Although a bit line shield technique for a nonvolatile memory has been disclosed (see, for example, Japanese Patent No. 3210355), there is no bit line shield technique for a volatile memory.

FIG. 6B is a circuit block diagram of a block in which the 3×4 dynamic flash memory cells illustrated in FIG. 6AC are arranged in a matrix. With reference to FIG. 6B, a read operation will be described. Memory cells C00o to C02o are connected to an odd-numbered bit line (an example of "odd-numbered bit line" in the claims) BL0o, and memory cells C10o to C12o are connected to an odd-numbered bit line BL1o. Memory cells C00e to C02e are connected to an even-numbered bit line (an example of "even-numbered bit line" in the claims) BL0e, and memory cells C10e to C12e are connected to an even-numbered bit line BL1e. Word lines WL0 to WL2 and plate lines PL0 to PL2 are connected in common to the memory cells connected to the even-numbered bit lines and the memory cells connected to the odd-numbered bit lines. Now, a description will be given of, for example, the case of selecting the word line WL0 and the plate line PL0. First, while transistors Tr01o and Tr11o have input from an odd-numbered control line Flo at the gates, the even-numbered bit lines BL0e and BL1e are selected, and data stored (an example of "data stored" in the claims) in the memory cells C00e and C10e are read to the even-numbered bit lines BL0e and BL1e, the odd-numbered bit lines BL0o and BL1o are fixed to a first voltage (an example of "first voltage" in the claims) VR. Here, for example, VR is a ground voltage (an example of "ground voltage" in the claims), which is 0 V. Transistors Tr02e and Tr12e have input from an even-numbered selection line F2e at the gates, and connect the even-numbered bit lines BL0e and BL1e to sense amplifier circuits (an example of "sense amplifier circuit" in the claims) SA0 and SA1, respectively. The data read to the sense amplifier circuits SA0 and SA1 are sequentially read to input/output lines IO and/IO through transistors Tr0A, Tr0B, Tr1A, and Tr1B, with column selection lines CSL0 and CSL1 serving as input.

The read operation will be further described with reference to FIG. 6B, which is a circuit block diagram of a block in which 3×4 dynamic flash memory cells are arranged in a matrix. Subsequently, while transistors Tr01e and Tr11e have input from an even-numbered control line Fle at the gates, the odd-numbered bit lines BL0o and BL1o are selected, and stored data in the memory cells are read to the odd-numbered bit lines BL0o BL1o, the even-numbered bit lines BL0e and BL1e are fixed to the first voltage VR. Transistors Tr02o and Tr12o have input from an odd-numbered selection line F2o at the gates, and connect the odd-numbered bit lines BL0o and BL1o to the sense amplifier circuits SA0 and SA1, respectively. The data read to the sense amplifier circuits SA0 and SA1 are sequentially read to the input/output lines IO and/IO through the transistors Tr0A, Tr0B, Tr1A, and Tr1B, with the column selection lines CSL0 and CSL1 serving as input.

The read operation will be further described with reference to FIG. 6B, which is a circuit block diagram of a block in which 3×4 dynamic flash memory cells are arranged in a matrix. After reading from the memory cells C00e and C10e to the even-numbered bit lines BL0e and BL1e, reading from the memory cells C00o and C10o to the odd-numbered bit lines BL0o and BL1o is performed. The sense amplifier circuit SA0 is shared between the odd-numbered bit line BL0o and the even-numbered bit line BL0e, and the sense amplifier circuit SA1 is shared between the odd-numbered bit line BL1o and the even-numbered bit line BL1e. As a result, the number of sense amplifier circuits of the memory array can be reduced by half, the chip size can be reduced accordingly, and an inexpensive memory device can be provided. Although the dynamic flash memory cell is a volatile memory, even-numbered and odd-numbered bit lines can be alternately grounded during reading because the dynamic flash memory cell takes advantage of a feature of a read non-destructive memory cell. That is, even if a certain word line WL is selected and a bit line BL is grounded in a state in which data stored in a memory cell can be read to the bit line BL, the data stored in the memory cell is not destroyed. The data to be read can be stably read to one selected bit line while noise is suppressed by the other shielded bit line.

A "1" write operation will be described with reference to FIG. 6C, which is a circuit block diagram of a block in which 3×4 dynamic flash memory cells are arranged in a matrix. Before "1" writing, the data in all the memory cells C00o to C02o, C10o to C12o, C00e to C02e, and C10e to C12e in this block are erased by using, for example, the erase method described with reference to FIGS. 4AA to 4AC. Now, a description will be given of, for example, the case of selecting the word line WL0 and the plate line PL0. First, data are sequentially loaded to the sense amplifier circuits SA0 and SA1 from the input/output lines IO and/IO through the transistors Tr0A, Tr0B, Tr1A, and Tr1B, with the column selection lines CSL0 and CSL1 serving as input. Subsequently, the transistors Tr02e and Tr12e have input from the even-numbered selection line F2e at the gates, and connects the even-numbered bit lines BL0e and BL1e to the sense amplifier circuits SA0 and SA1, respectively. While the transistors Tr01o and Tr11o have input from the odd-numbered control line Flo at the gates, and a "1" write operation on the memory cells C00e and C10e is being performed through the even-numbered bit lines BL0e and BL1e, the odd-numbered bit lines BL0o and BL1o are fixed to a second voltage (an example of "second voltage" in the claims) VW. Here, VW is 0 V, for example.

The "1" write operation will be further described with reference to FIG. 6C, which is a circuit block diagram of a block in which 3×4 dynamic flash memory cells are arranged in a matrix. Data are sequentially loaded again to the sense amplifier circuits SA0 and SA1 from the input/output lines IO and/IO through the transistors Tr0A, Tr0B, Tr1A, and Tr1B, with the column selection lines CSL0 and CSL1 serving as input. Subsequently, the transistors Tr02o and Tr12o have input from the odd-numbered selection line F2o at the gates, and connect the odd-numbered bit lines BL0o and BL1o to the sense amplifier circuits SA0 and SA1, respectively. While the transistors Tr01e and Tr11e have input from the even-numbered control line Fle at the gates, and a "1" write operation on the memory cells C00o and C10o is being performed through the odd-numbered bit lines BL0o and BL1o, the even-numbered bit lines BL0e and BL1e are fixed to the second voltage VW.

The "1" write operation will be further described with reference to FIG. 6C, which is a circuit block diagram of a block in which 3-4 dynamic flash memory cells are arranged in a matrix. As described above, also in the "1" write operation, the even-numbered and odd-numbered bit lines may be alternately selected, and the "1" write operation on the memory cells connected thereto may be performed. This is because, if the bit line connected to the memory cell maintaining an erase state is sandwiched between bit lines performing a "1" write operation, the bit line is affected by noise resulting from capacitive coupling between the adjacent bit lines. The sense amplifier circuit SA0 is shared between the odd-numbered bit line BL0o and the even-numbered bit line BL0e, and the sense amplifier circuit SA1 is shared between the odd-numbered bit line BL1o and the even-numbered bit line BL1e. As a result, the number of sense amplifier circuits of the block can be reduced by half, the chip size can be reduced accordingly, and an inexpensive memory device can be provided.

FIGS. 7A to 7K are diagrams for describing a high-speed dynamic flash memory cell technique according to the first embodiment of the present invention.

Figure 7A:
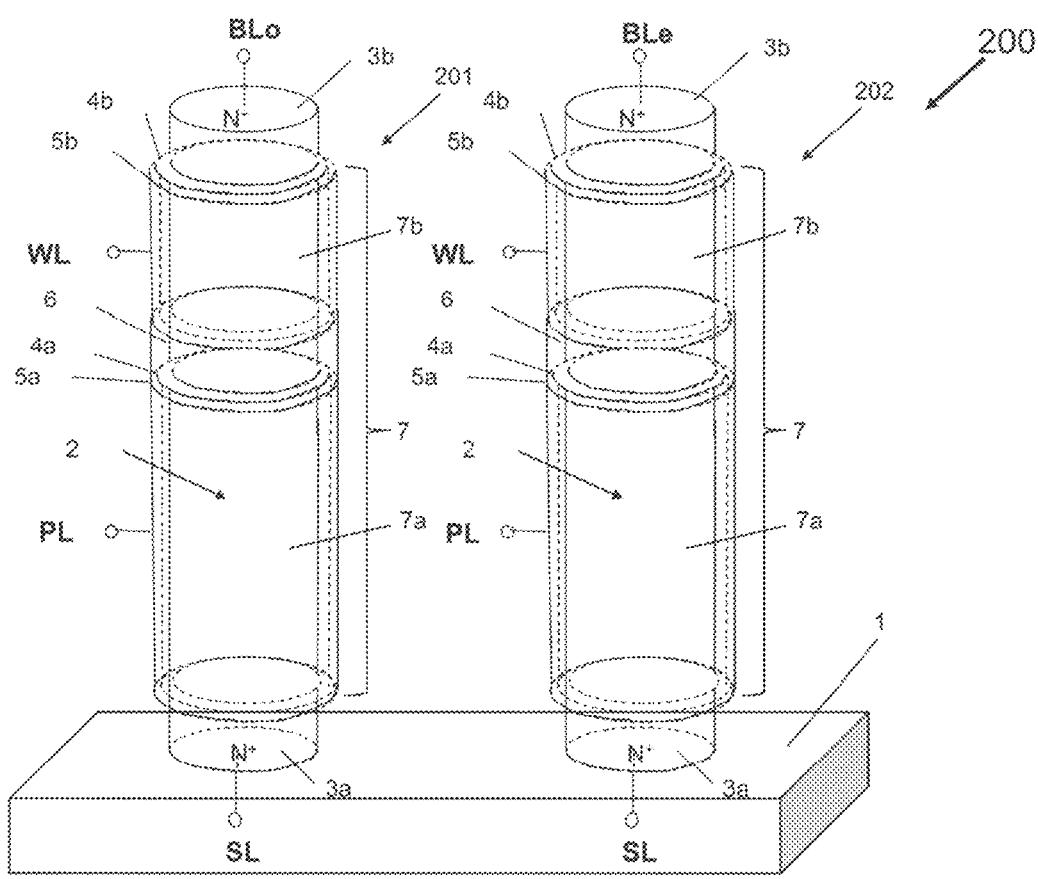
FIG. 7A is a diagram for describing a high-speed dynamic flash memory cell technique according to the first embodiment.

FIG. 7A illustrates the structure of a high-speed dynamic flash memory cell according to the first embodiment of the present invention. In the high-speed dynamic flash memory cell, one second memory cell (an example of "second memory cell" in the claims) 200 is constituted by using two semiconductor bases of the dynamic flash memory cell according to the first embodiment of the present invention described with reference to FIG. 1. The second memory cell 200 includes an odd-numbered memory cell (an example of "odd-numbered memory cell" in the claims) 201, in which the first impurity region 3a is connected to a source line SL, the second impurity region 3b is connected to an odd-numbered bit line BLo, the first gate conductor layer 5a is connected to a plate line PL serving as a first drive control line, and the second gate conductor layer 5b is connected to a word line WL. The second memory cell 200 includes an even-numbered memory cell (an example of "even-numbered memory cell" in the claims) 202, in which the first impurity region 3a is connected to the source line SL, the second impurity region 3b is connected to an even-numbered bit line BLe, the first gate conductor layer 5a is connected to the plate line PL serving as the first drive control line, and the second gate conductor layer 5b is connected to the word line WL.

Figure 7B:
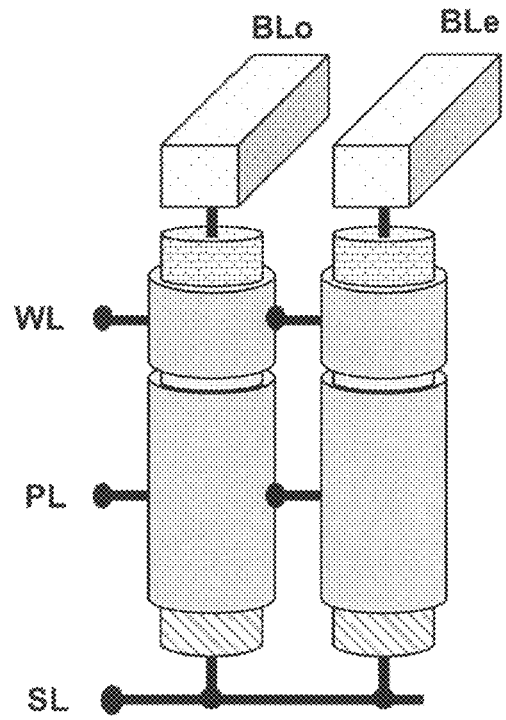
FIGS. 7BA and 7BB are diagrams for describing the high-speed dynamic flash memory cell technique according to the first embodiment.
Figure 7B:
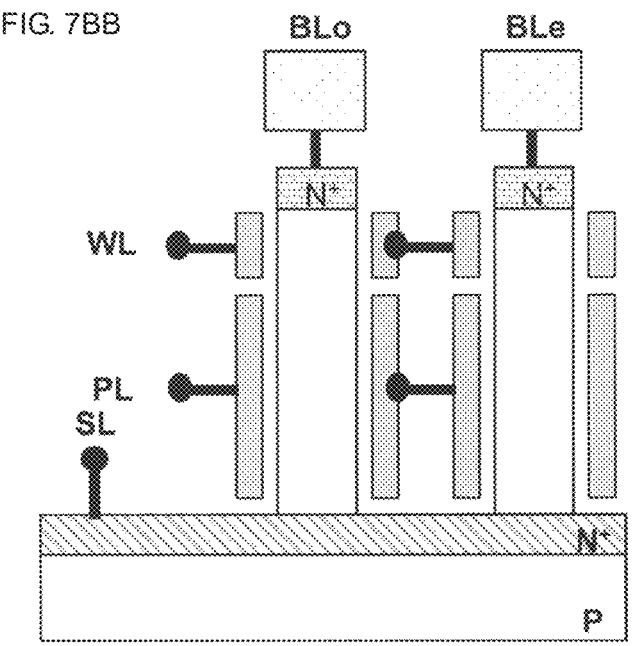

FIGS. 7BA, 7BB, and 7CA are a bird's-eye view, a sectional view, and an equivalent circuit diagram, respectively, of a one-bit (an example of "one-bit" in the claims) high-speed dynamic flash memory cell formed of two semiconductor bases. The odd-numbered bit line BLo, the even-numbered bit line BLe, the source line SL, the plate line PL, and the word line WL are connected to the high-speed dynamic flash memory cell.

Figure 7C:
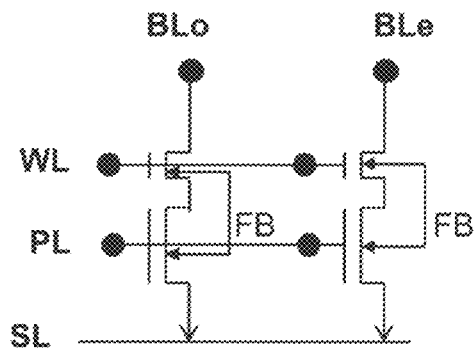
FIGS. 7CA and 7CB are diagrams for describing the high-speed dynamic flash memory cell technique according to the first embodiment.
Figure 7C:
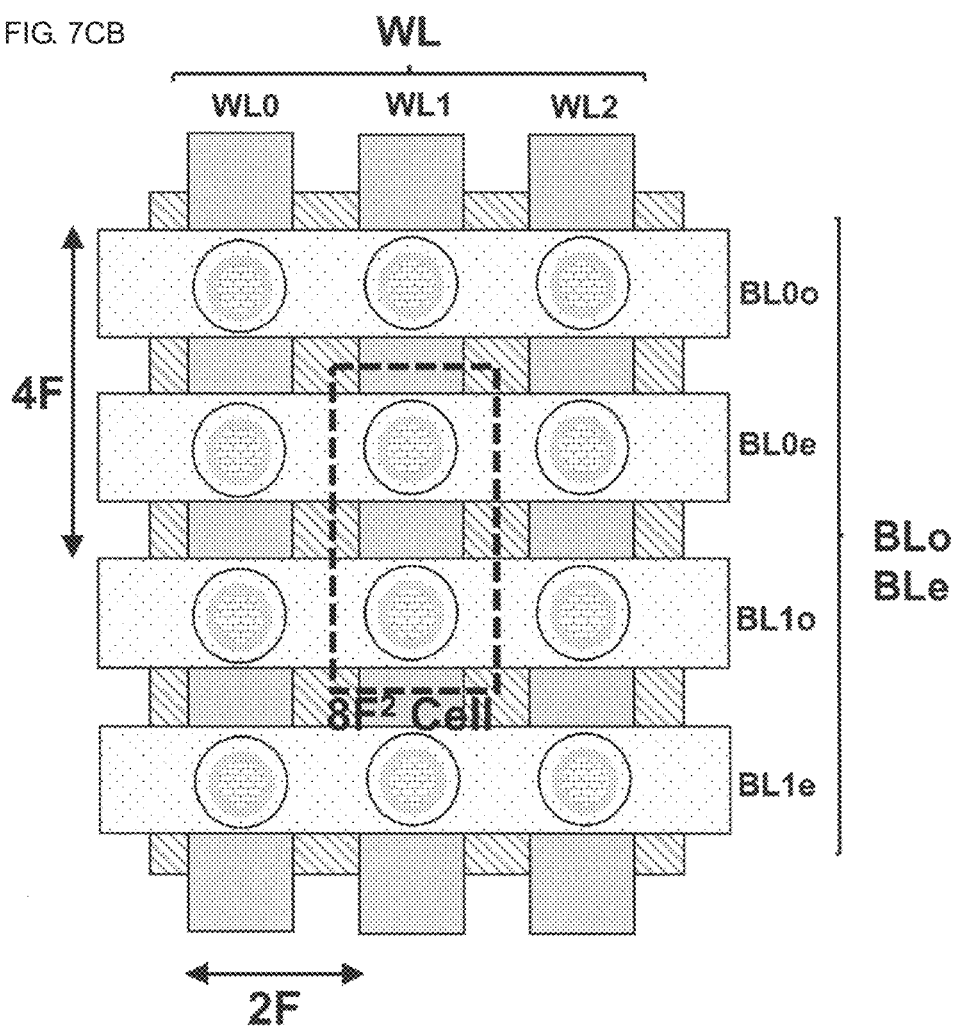

FIG. 7CB is a plan view of a second block (an example of "second block" in the claims) in which a plurality of (3×2) high-speed dynamic flash memory cells are arranged in a matrix. The high-speed dynamic flash memory cells can be arranged with a total pitch 4F of odd-numbered bit lines BLo and even-numbered bit lines BLe and a pitch 2F of word lines WL, and with a one-bit memory cell size of 4F×2F=8F$^2$. Here, F is referred to as a ground rule or a design rule (F: feature size). For example, F=15 nm in a miniaturized dynamic flash memory cell. In this example, the interval between the odd-numbered bit line BLo and the even-numbered bit line BLe is only 15 nm. However, the odd-numbered bit line BLo and the even-numbered bit line BLe transmit complementary signals to the sense amplifier circuit, and thus a high-speed read operation can be performed.

Figure 7D:
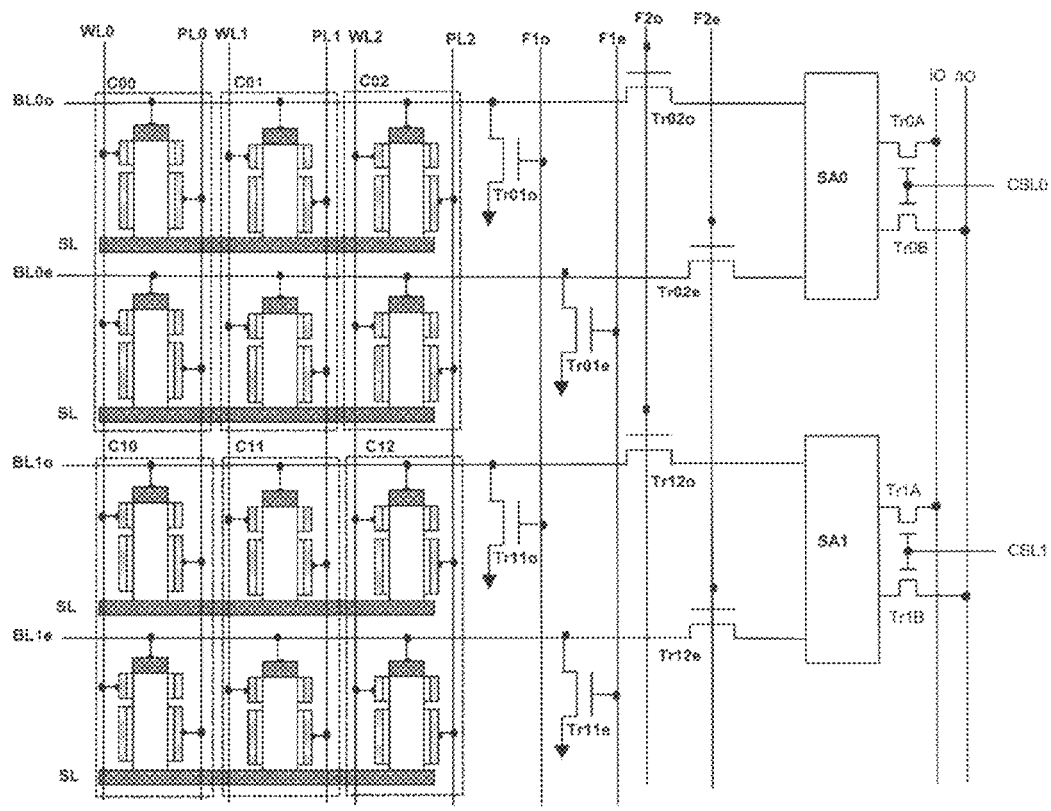
FIG. 7D is a diagram for describing the high-speed dynamic flash memory cell technique according to the first embodiment.

FIG. 7D is a circuit block diagram of a second block in which the 3×2 high-speed dynamic flash memory cells C00 to C12 illustrated in FIG. 7A are arranged in a matrix. Odd-numbered bit lines BL0o and BL1o, even-numbered bit lines BL0e and BL1e, source lines SL, word lines WL0 to WL2, and plate lines PL0 to PL2 are connected to the high-speed dynamic flash memory cells C00 to C12. Sense amplifier circuits SA0 and SA1 are connected to the respective bit line pairs. The sense amplifier circuits SA0 and SA1 are connected to input/output lines IO and /IO via transistors Tr0A to Tr1B, and the gates of the transistors Tr0A to Tr1B are connected to column selection lines CSL0 and CSL1, respectively. In the second block illustrated in FIG. 7D, for example, the "0" erase operation described with reference to FIG. 4AB is performed, and the positive hole group 9 generated by impact ionization is not present in the semiconductor bases 7 of all the memory cells.

First, a difference among a "0" erase operation, a data "1" write operation, and a data "0" write operation will be described. First, regarding a "0" erase operation, for example, the "0" erase operation described with reference to FIG. 4AB is performed, and thus the positive hole group 9 is not present in the semiconductor bases 7 of the odd-numbered memory cell 201 and the even-numbered memory cell 202 constituting the second memory cell 200. From this "0" erase operation state, a data "1" write operation and a data "0" write operation are performed. In the data "1" write operation, the voltage of the odd-numbered bit line BLo is changed from the low voltage Vss to the high voltage $V_{BLH}$, and an impact ionization phenomenon, for example, causes the positive hole group 9 to remain in the semiconductor base 7 of the odd-numbered memory cell 201 of the second memory cell 200. On the other hand, in the data "0" write operation, the voltage of the even-numbered bit line BLe is changed from the low voltage Vss to the high voltage $V_{BLH}$, and an impact ionization phenomenon, for example, causes the positive hole group 9 to remain in the semiconductor base 7 of the even-numbered memory cell 202 of the second memory cell 200. As described above, writing for the odd-numbered bit line BLo is performed in the data "1" write operation, and writing for the even-numbered bit line BLe is performed in the data "0" write operation.

Figure 7E:
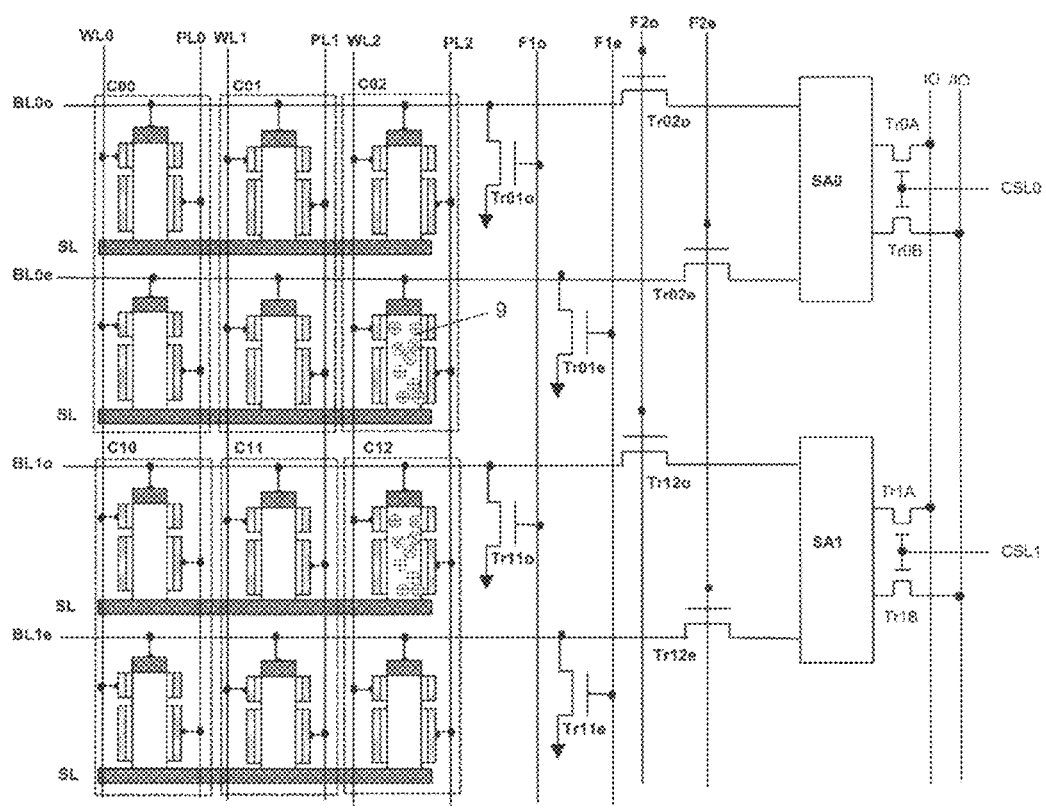
FIG. 7E is a diagram for describing the high-speed dynamic flash memory cell technique according to the first embodiment.
Figure 7F:
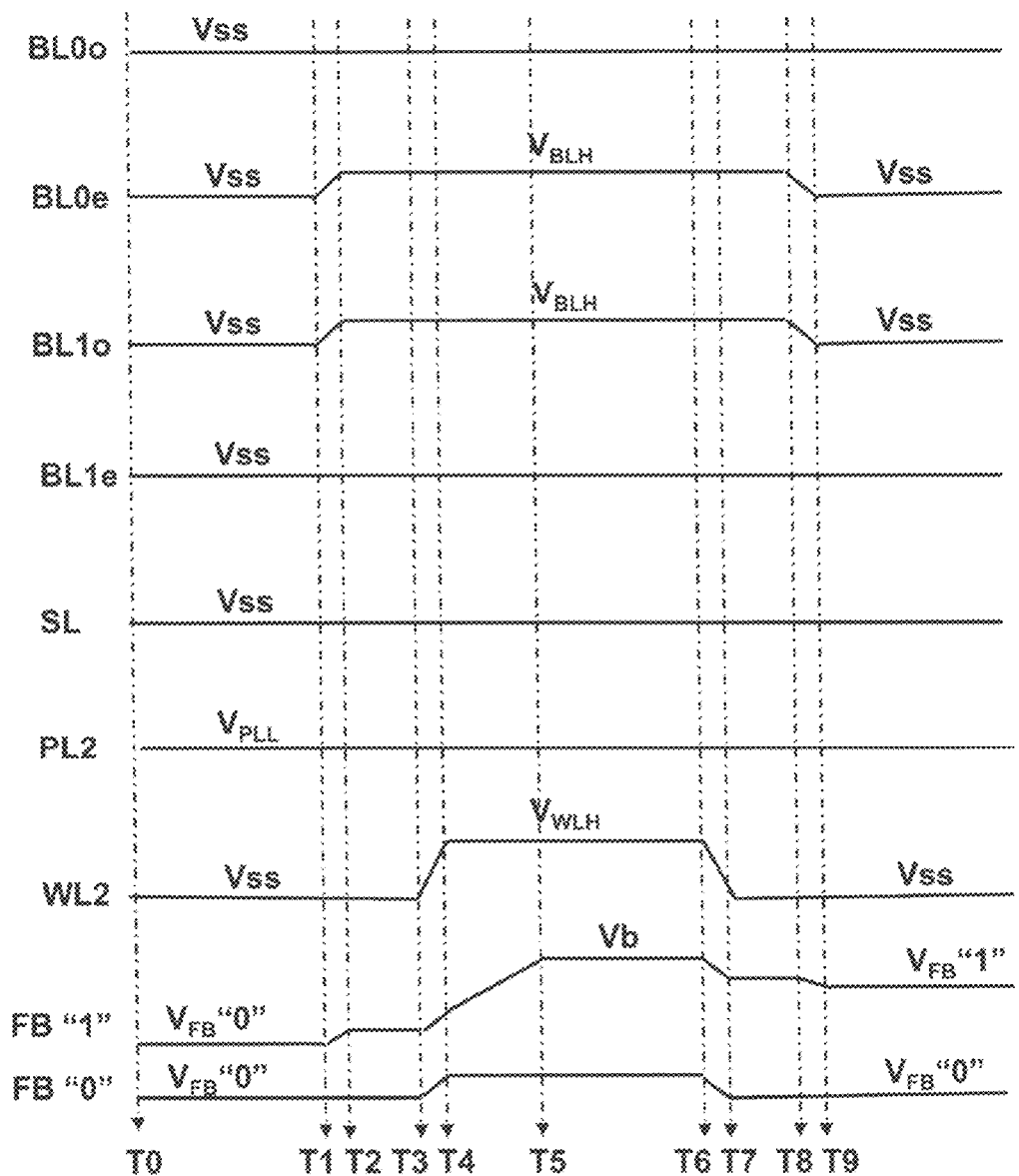
FIG. 7F is a diagram for describing the high-speed dynamic flash memory cell technique according to the first embodiment.

Next, a data write operation of the high-speed dynamic flash memory cells will be described. FIG. 7E is a circuit block diagram of a write operation of a second block in which 3×2 high-speed dynamic flash memory cells C00 to C12 are arranged in a matrix, and FIG. 7F is an operation waveform diagram of the write operation of the high-speed dynamic flash memory cells. The write operation is performed by, for example, the method described with reference to FIGS. 3A to 3D. A description will be given of, for example, the case of selecting a word line WL2 and performing an operation of writing data "0" in the second memory cell C02 and writing data "1" in the second memory cell C12. The sense amplifier circuits SA0 and SA1 are, for example, dynamic sense amplifier circuits, and date to be written is loaded in advance from the input/output lines IO and /IO.

An example of the data write operation of the high-speed dynamic flash memory cells will be further described with reference to FIG. 7E and FIG. 7F. From time T1 to time T2, the voltages of the even-numbered bit line BL0e and the odd-numbered bit line BL1o rise from the low voltage Vss to the high voltage $V_{BLH}$. Here, Vss is 0 V and $V_{BLH}$ is 2 V, for example. From time T3 to time T4, the voltage of the word line WL2 rises from the low voltage Vss to the high voltage $V_{WLH}$. At this time, a fixed voltage of $V_{PLL}$ is applied to the plate line PL2, and a current flows through the semiconductor base 7 of the even-numbered memory cell 202 of the second memory cell C02 and the semiconductor base 7 of the odd-numbered memory cell 201 of the second memory cell C12. As a result, the positive hole group 9 remains in both the semiconductor bases 7 due to an impact ionization phenomenon. This state is illustrated in FB "1" in FIG. 7F and FIG. 7E. Thereafter, as in the "1" write operation described with reference to FIG. 3A, the voltage of the word line WL2 drops from the high voltage $V_{WLH}$ to the low voltage Vss, the voltages of the even-numbered bit line BL0e and the odd-numbered bit line BL1o drop from the high voltage $V_B$m to the low voltage Vss, and the operation of writing data "0" in the second memory cell C02 and writing the data "1" in the second memory cell C12 is finished.

Figure 7G:
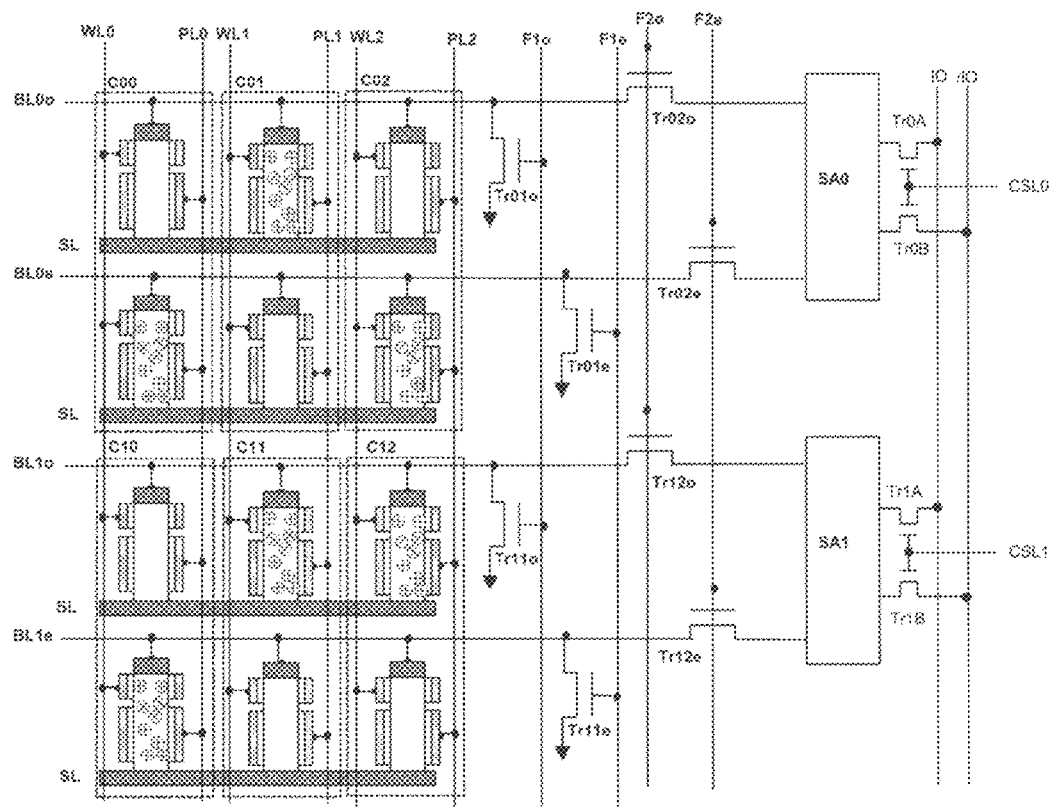
FIG. 7G is a diagram for describing the high-speed dynamic flash memory cell technique according to the first embodiment.

Next, a data read operation (an example of a "data read operation" in the claims) of the high-speed dynamic flash memory cells will be described with reference to FIG. 7G and FIG. 7H. As illustrated in FIG. 7G, data "1" is written in the second memory cells C01, Cl1, and C12, and the positive hole group 9 generated by, for example, an impact ionization phenomenon, remains in the semiconductor base 7 of each odd-numbered memory cell 201. Data "0" is written in the second memory cells C00, C02, and C10, and the positive hole group 9 generated by, for example, an impact ionization phenomenon, remains in the semiconductor base 7 of each even-numbered memory cell 202.

The data read operation of the high-speed dynamic flash memory cells will be further described with reference to FIG. 7G and FIG. 7H. At time T1, the odd-numbered bit lines BL0o and BL1o and the even-numbered bit lines BL0e and BL1e are pre-charged from the low voltage Vss to a high voltage $V_{BLR}$ for reading. In this case, the odd-numbered bit lines BL0o and BL1o and the even-numbered bit lines BL0e and BL1e may be floated after being pre-charged to the high voltage $V_{BLR}$ for reading. Alternatively, for example, load transistors of P-channel MOS transistors may be connected to the odd-numbered bit lines BL0o and BL1o and the even-numbered bit lines BL0e and BL1e to apply a DC voltage of the high voltage $V_{BLR}$ for reading. In this case, a load transistor current and a memory cell current compete with each other.

The data read operation of the high-speed dynamic flash memory cells will be further described with reference to FIG. 7G and FIG. 7H. At time T2, the word line WL2, for example, is selected and the voltage thereof rises from the low voltage Vss to a high voltage $V_{WLR}$ for reading. Accordingly, because the positive hole group 9 remains in the semiconductor base 7 of the even-numbered memory cell 202 of the second memory cell C02 and the semiconductor base 7 of the odd-numbered memory cell 201 of the second memory cell C12, a memory cell current flows. As a result, the even-numbered bit line BL0e and the odd-numbered bit line BL1o are discharged and the voltages thereof drop from the high voltage $V_{BLR}$ for reading to the low voltage Vss.

The data read operation of the high-speed dynamic flash memory cells will be further described with reference to FIG. 7G and FIG. 7H. For example, at the time T4, the sense amplifier circuits SA0 and SA1 are activated to perform data reading of detecting the potential difference between the odd-numbered bit line and the even-numbered bit line. The data read to the sense amplifier circuits SA0 and SA1 are transferred to an output buffer (not illustrated) through input/output lines by sequentially selecting the column selection lines CSL0 and CSL1. Finally, to reset the data read operation, the voltage of the word line WL2 is returned from the high voltage $V_{WLR}$ for reading to the low voltage Vss at time T5, and the voltages of the bit lines BL0o and BL1e are returned from the high voltage $V_{BLR}$ for reading to the low voltage Vss at time T6, before finishing the data read operation. Even after the read operation is finished, the voltages of all the plate lines PL are maintained at $V_{PLL}$ to wait for the next operation cycle.

A read operation of the memory device including the SGT according to the first embodiment will be described with reference to FIG. 7I.

Figure 7I:
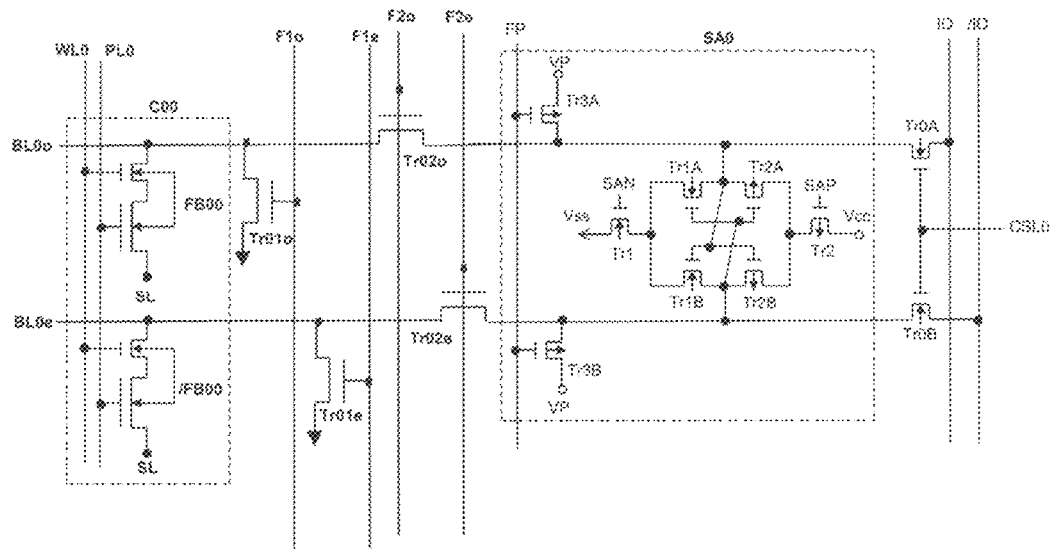
FIG. 7I is a diagram for describing the high-speed dynamic flash memory cell technique according to the first embodiment.

FIG. 7I illustrates more details of the circuit including the sense amplifier circuit SA0 in the circuit block diagram of dynamic flash memory cells. Here, a dynamic sense amplifier circuit is illustrated as the sense amplifier circuit SA0, for example. N-channel MOS transistor regions Tr1A and Tr1B and P-channel MOS transistors Tr2A and Tr2B constitute a flip-flop circuit. The flip-flop circuit is activated by an N-channel MOS transistor region Tr1 that receives an N-channel sense amplifier activation signal SAN at its gate and a P-channel MOS transistor region Tr2 that receives a P-channel sense amplifier activation signal SAP at its gate. As a result, in a data write operation, data to be written that is loaded from the input/output lines IO and/IO is latched in the flip-flop circuit through N-channel MOS transistor regions Tr0A and Tr0B whose gates have input from the column selection line CSL0. In a data read operation, the data written in the second memory cell C00 is selected by the word line WL0, read to the odd-numbered bit line BL0o and the even-numbered bit line BL0e, read to the flip-flop circuit through the N-channel MOS transistor regions Tr02o and Tr02e that receive transfer signals F2o and F2e at their gates, and latched. Immediately before the data write operation and the data read operation, resetting of the flip-flop circuit and pre-charging of the odd-numbered bit line BL0o and the even-numbered bit line BL0e are performed by N-channel MOS transistor regions Tr3A and Tr3B whose gates have input from a pre-charge signal line. In the data write operation and the data read operation, the voltage of the plate line PL0 is set to the low voltage $V_{PLL}$. In this way, written data and read data are latched by the dynamic sense amplifier circuit, and a high-speed data write operation and a high-speed data read operation can be performed.

Figure 7J:
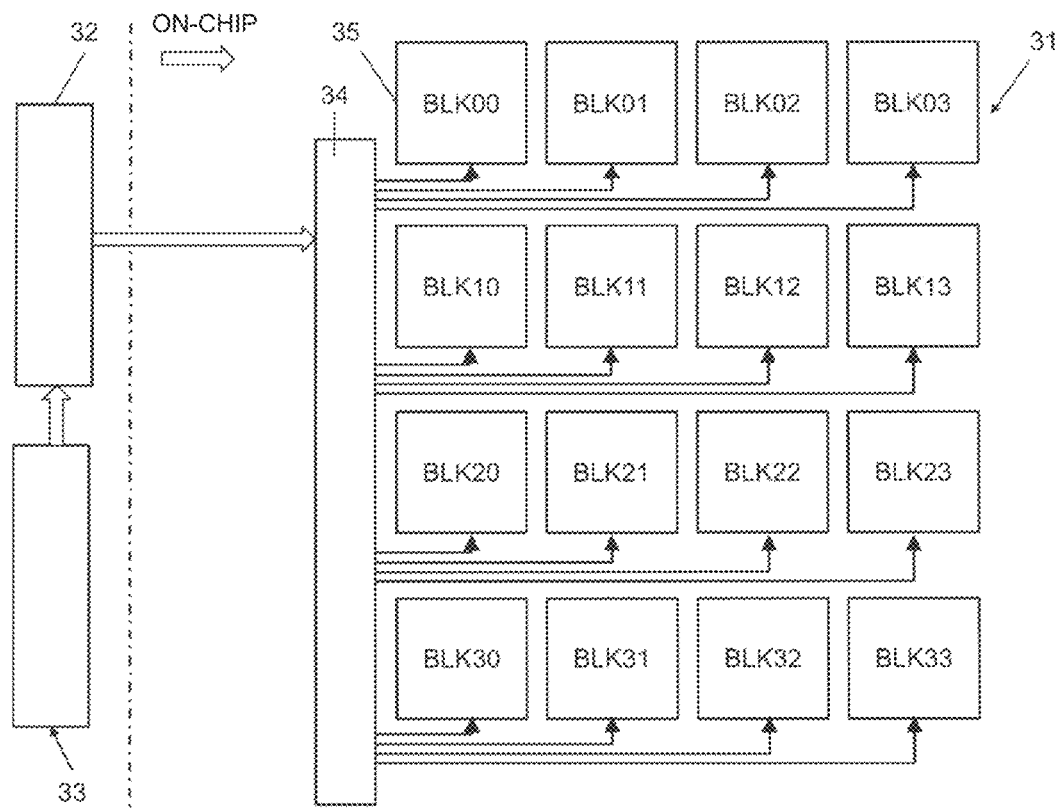
FIG. 7J is a diagram for describing the high-speed dynamic flash memory cell technique according to the first embodiment.

FIG. 7J is a circuit block diagram of a chip of the dynamic flash memory cells according to the first embodiment.

In FIG. 7J, a controller circuit 33 and a logical/physical block address conversion lookup table circuit (abbreviated as a logical/physical conversion table) 32 constantly manage which physical block address of the dynamic flash memory corresponds to data stored in a logical block address. This is because the correspondence between a logical block address and a physical block address needs to be constantly managed because data in a block is rewritten by using an already erased block in the dynamic flash memory, as in a flash memory. The controller circuit 33 and the logical/physical conversion table 32 may be provided in the chip of the dynamic flash memory, or may be provided outside the chip as illustrated in FIG. 7J. An instruction from the logical/physical conversion table 32 is input to a block address decoder circuit 34, and a block to be subjected to an erase, write, or read operation is selected from among blocks BLK00 to BLK33. FIG. 7J illustrates an example in which all blocks are constituted by a first block formed of first memory cells.

Figure 7K:
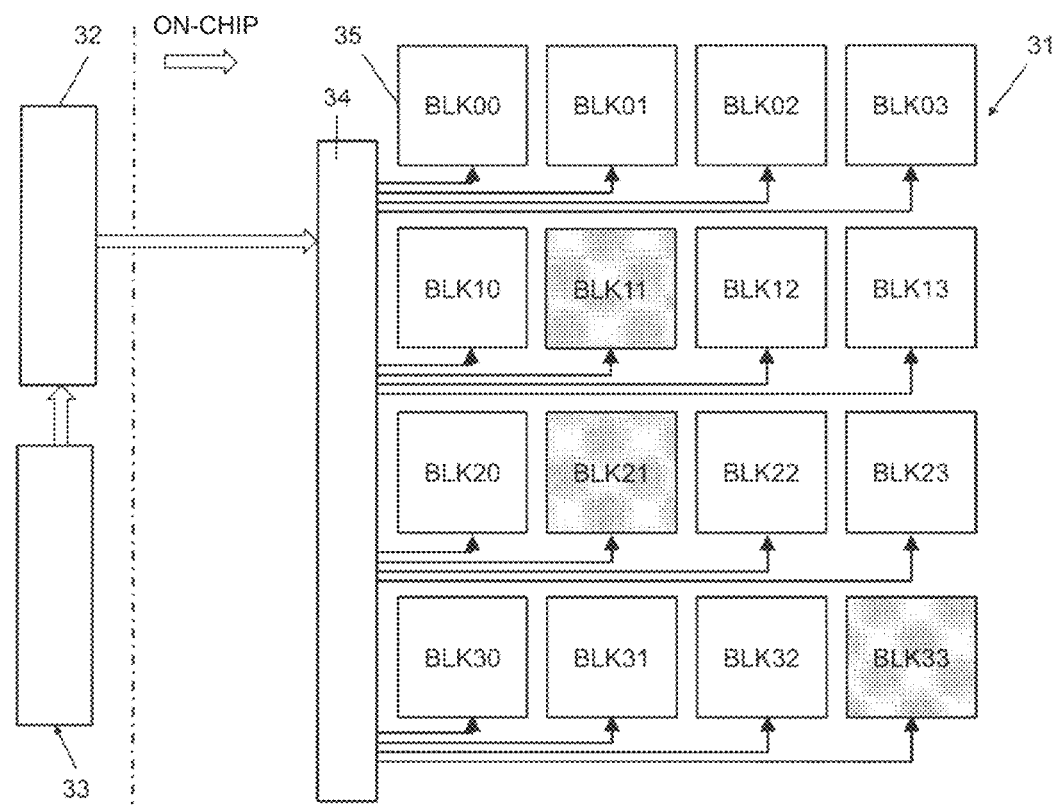
FIG. 7K is a diagram for describing the high-speed dynamic flash memory cell technique according to the first embodiment.
Figure 8A:
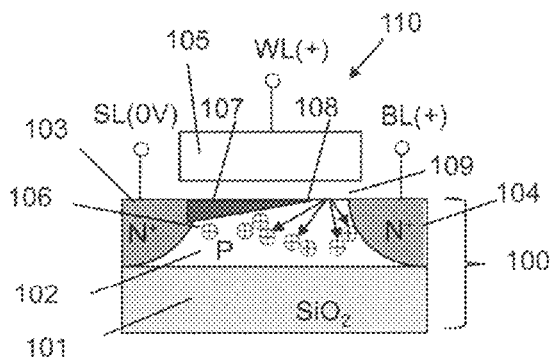
FIGS. 8A, 8B, 8C, and 8D are diagrams for describing a write operation of a capacitorless DRAM memory cell according to the related art.
Figure 8B:
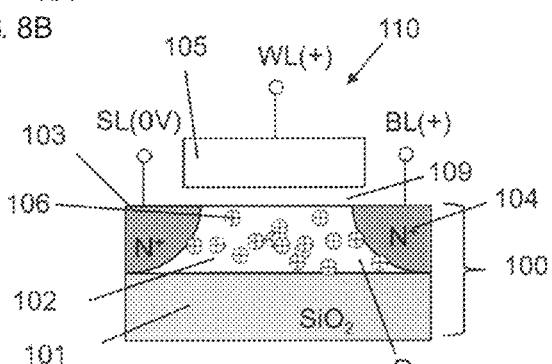
Figure 8C:
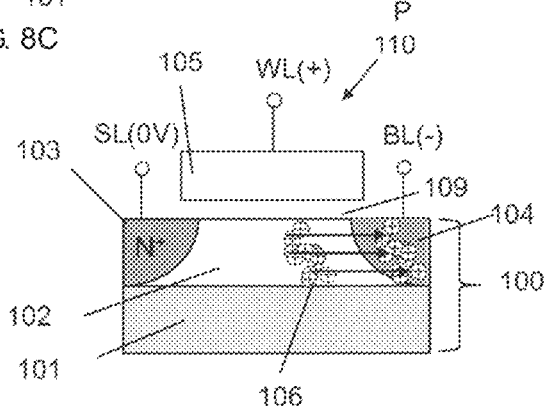
Figure 8D:
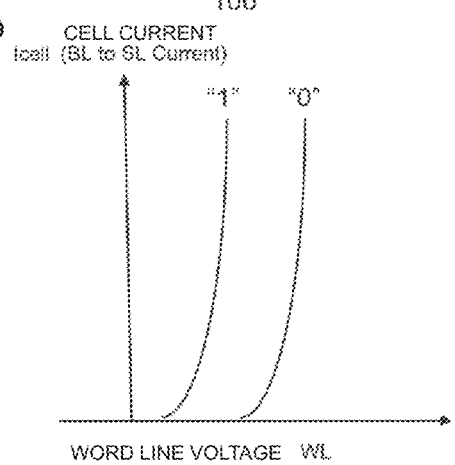
Figure 9A:
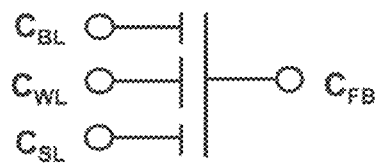
FIGS. 9A and 9B are diagrams for describing a problem in the operation of the capacitorless DRAM memory cell according to the related art.
Figure 9B:
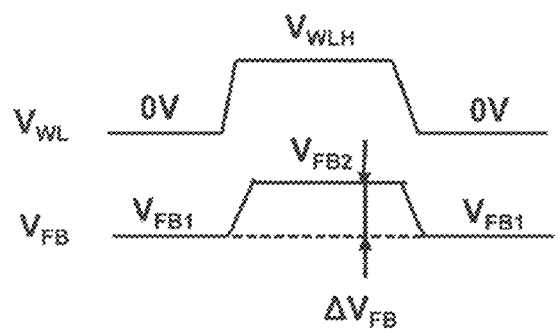
Figure 10A:
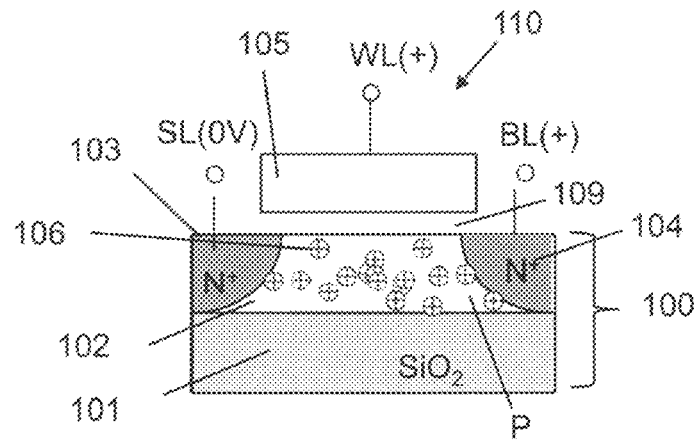
FIGS. 10A, 10B, and 10C are diagrams for describing a read operation of the capacitorless DRAM memory cell according to the related art.
Figure 10B:
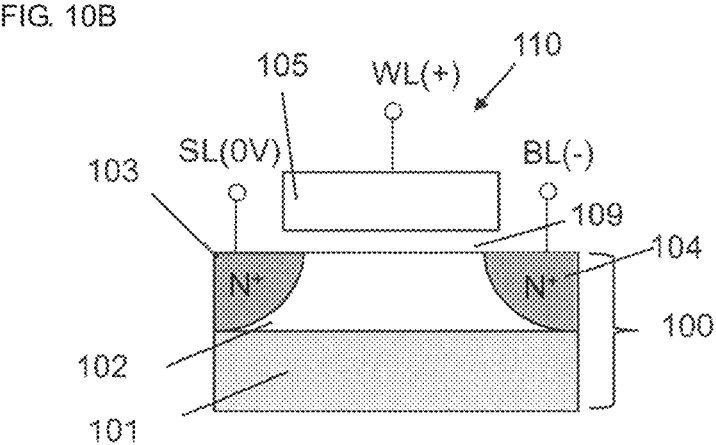
Figure 10C:
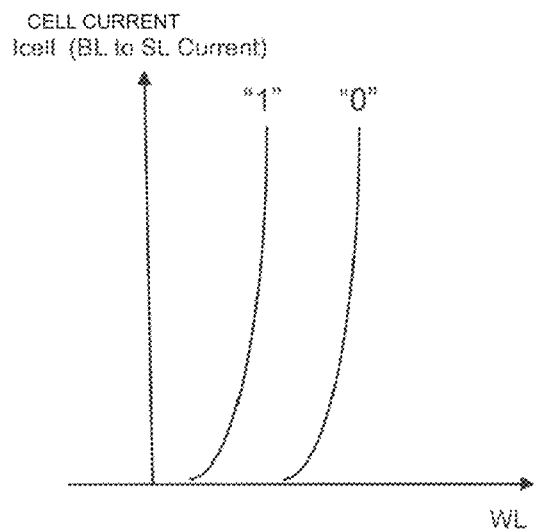

Next, FIG. 7K illustrates an assumed case where the controller circuit 33 outputs, to three blocks BLK11, BLK21, and BLK33, an instruction to constitute a second block formed of second memory cells. As described above, the number of blocks to be selected is not limited to one, and a plurality of blocks may be simultaneously selected and allocated as second blocks of the high-speed dynamic flash memory. Thus, the number of first blocks and the number of the second blocks can be made variable in the semiconductor memory device that is in operation, and the high-speed dynamic flash memory having a large capacity can be used efficiently.

In FIG. 1, desirably, the length in the vertical direction of the first gate conductor layer 5a connected to the plate line PL is larger than the length in the vertical direction of the second gate conductor layer 5b connected to the word line WL, so that $C_{PL}>C_{WL}$ holds. However, only adding of the plate line PL decreases a coupling ratio ($C_{WL}/(C_{PL}+C_{WL}+C_{BL}+C_{SL})$) of the capacitive coupling of the word line WL to the semiconductor base 7. As a result, the potential variation $\Delta V_{FB}$ of the semiconductor base 7 of the floating body reduces.

As the voltage $V_{PLL}$ of the plate line PL, a fixed voltage of 2 V may be applied, for example.

In FIG. 1, the Si pillar 2 may have a horizontal sectional shape that is circular, elliptical, or rectangular, so as to perform the dynamic flash memory operation described in the present embodiment. Circular, elliptical, and rectangular dynamic flash memory cells may be disposed together on the same chip.

A dynamic flash memory element has been described with reference to FIG. 1 by taking, as an example, the SGT in which the first gate insulating layer 4a and the second gate insulating layer 4b are disposed so as to surround the entire side surface of the Si pillar 2 standing in the vertical direction on the substrate 1, and the first gate conductor layer 5a and the second gate conductor layer 5b are disposed so as to surround the entire first gate insulating layer 4a and second gate insulating layer 4b. As described in the present embodiment, the dynamic flash memory element may have any structure as long as it satisfies the condition that the positive hole group 9 generated by an impact ionization phenomenon is held in the semiconductor base 7. For this purpose, the semiconductor base 7 may have a floating body structure isolated from the substrate 1. Thus, the dynamic flash memory operation described above can be performed even when the semiconductor base is formed horizontally with respect to a substrate Sub by using, for example, a GAA (Gate All Around: see, for example, E. Yoshida and T. Tanaka: "A Design of Capacitorless 1T-DRAM Cell Using Gate-Induced Drain-Leakage (GIDL) Current for Low-Power and High-Speed Embedded Memory," IEEE IEDM (2006)) technique, which is one of SGTs, and a nanosheet technique (see, for example, J. Y. Song, W. Y. Choi, J. H. Park, J. D. Lee, and B-G. Park: "Design Optimization of Gate-All-Around (GAA) MOSFETs," IEEE Trans. Electron Devices, vol. 5, no. 3, pp. 186 to 191, May 2006). Alternatively, a device structure using silicon on insulator (SOI) (see, for example, J. Wan, L. Rojer, A. Zaslavsky, and S. Critoloveanu: "A Compact Capacitor-Less High-Speed DRAM Using Field Effect-Controlled Charge Regeneration," Electron Device Letters, Vol. 35, No. 2, pp. 179-181 (2012); T. Ohsawa, K. Fujita, T. Higashi, Y. Iwata, T. Kajiyama, Y. Asao, and K. Sunouchi: "Memory design using a one-transistor gain cell on SOI," IEEE JSSC, vol. 37, No. 11, pp. 1510-1522 (2002); T. Shino, N. Kusunoki, T. Higashi, T. Ohsawa, K. Fujita, K. Hatsuda, N. Ikumi, F. Matsuoka, Y. Kajitani, R. Fukuda, Y. Watanabe, Y. Minami, A. Sakamoto, J. Nishimura, H. Nakajima, M. Morikado, K. Inoh, T. Hamamoto, A. Nitayama: "Floating Body RAM Technology and its Scalability to 32 nm Node and Beyond," IEEE IEDM (2006); and E. Yoshida and T. Tanaka: "A Design of Capacitorless 1T-DRAM Cell Using Gate-Induced Drain-Leakage (GIDL) Current for Low-Power and High-Speed Embedded Memory," IEEE IEDM (2006)) may be used. In this device structure, the bottom portion of a semiconductor base is in contact with an insulating layer of an SOI substrate, and another semiconductor base is surrounded by a gate insulating layer and an element isolation insulating layer. Also in this structure, the semiconductor base has a floating body structure. As described above, in the dynamic flash memory element provided by the present embodiment, it is sufficient that the semiconductor base have a floating body structure. Even in a structure in which a Fin transistor (see, for example, H. Jiang, N. Xu, B. Chen, L. Zeng1, Y. He, G. Du, X. Liu and X. Zhang: "Experimental investigation of self-heating effect (SHE) in multiple-fin SOI FinFETs," Semicond. Sci. Technol. 29 (2014) 115021 (7pp)) is formed on an SOI substrate, the dynamic flash operation can be performed as long as the semiconductor base has a floating body structure.

In "1" writing, electron-hole pairs may be generated by using a gate-induced drain leakage (GIDL) current (see, for example, E. Yoshida and T. Tanaka: "A Capacitorless 1T-DRAM Technology Using Gate-Induced Drain-Leakage (GIDL) Current for Low-Power and High-Speed Embedded Memory", IEEE Transactions on Electron Devices, Vol. 53, No. 4, pp. 692-697, April 2006), and the semiconductor base 7 may be filled with the generated positive hole group.

Equations (1) to (10) in the present specification and drawings are used for qualitatively describing phenomena, and the phenomena are not limited by these equations.

In FIG. 3B, the reset voltages of the word line WL, the bit line BL, and the source line SL are denoted by Vss; however, these voltages may be different voltages.

FIG. 4B illustrates an example of erase operation conditions. In contrast to this, the voltages to be applied to the source line SL, the plate line PL, the bit line BL, and the word line WL may be changed as long as the positive hole group 9 in the semiconductor base 7 can be discharged from either or both of the N$^+$ layer 3a and the N$^+$ layer 3b. In a block erase operation, an erase voltage may be applied to the source line SL of a selected block, and the bit line BL may be brought into a floating state.

In FIG. 1, in the semiconductor base 7 at a portion surrounded by the insulating layer 6, the potential distributions of the first channel Si layer 7a and the second channel Si layer 7b are connected to each other in the vertical direction. Accordingly, the semiconductor base 7 of the first channel Si layer 7a and the second channel Si layer 7b is continuous in the region surrounded by the insulating layer 6 in the vertical direction.

In FIG. 1, the first gate conductor layer 5a may be divided into two or more portions in plan view or in the vertical direction, and the individual portions may be operated synchronously or asynchronously as conductor electrodes of plate lines at the same driving voltage or different driving voltages. Similarly, the second gate conductor layer 5b may be divided into two or more portions in plan view or in the vertical direction, and the individual portions may be operated synchronously or asynchronously as conductor electrodes of word lines at the same driving voltage or different driving voltages. Accordingly, the dynamic flash memory operation can be performed. In a case where the first gate conductor layer 5a is divided into two or more portions, at least one of the portions implements the function of the first gate conductor layer 5a. Also in the divided second gate conductor layer 5b, at least one of the portions implements the function of the second gate conductor layer 5b. In the vertical direction, isolated gate conductor layers of one of the first gate conductor layer 5a and the second gate conductor layer 5b may be arranged on both sides of the other of the first gate conductor layer 5a and the second gate conductor layer 5b.

The conditions of voltages to be applied to the bit line BL, the source line SL, the word line WL, and the plate line PL and the voltage of the floating body are examples for performing basic operations of an erase operation, a write operation, and a read operation, and other voltage conditions may be used as long as the basic operations of the present invention can be performed.

In FIG. 1, the first gate conductor layer 5a may be connected to the word line WL, and the second gate conductor layer 5b may be connected to the plate line PL. Also with this configuration, the above-described dynamic flash memory operation can be performed.

A junctionless structure may be used in which the $N^+$ layers 3a and 3b and the semiconductor base 7 as a P layer have the same conductivity in the dynamic flash memory cell illustrated in FIG. 1. The same applies to other embodiments.

The present embodiment provides the following features.

Feature 1

In the dynamic flash memory cell of the present embodiment, the $N^+$ layers 3a and 3b serving as the source and drain, the semiconductor base 7, the first gate insulating layer 4a, the second gate insulating layer 4b, the first gate conductor layer 5a, and the second gate conductor layer 5b are formed in a pillar shape as a whole. The $N^+$ layer 3a serving as the source is connected to the source line SL, the $N^+$ layer 3b serving as the drain is connected to the bit line BL, the first gate conductor layer 5a is connected to the plate line PL, and the second gate conductor layer 5b is connected to the word line WL. In this structure, the gate capacitance of the first gate conductor layer 5a connected to the plate line PL is larger than the gate capacitance of the second gate conductor layer 5b connected to the word line WL. In this dynamic flash memory cell, the first gate conductor layer 5a and the second gate conductor layer 5b are stacked in the vertical direction. Thus, even in the structure in which the gate capacitance of the first gate conductor layer 5a connected to the plate line PL is larger than the gate capacitance of the second gate conductor layer 5b connected to the word line WL, the memory cell area is not large in plan view. Accordingly, a higher performance and a higher degree of integration of the dynamic flash memory cells can be simultaneously realized. In data reading, the voltage to be applied to the first gate conductor layer 5a connected to the plate line PL is set to be higher than the threshold voltage at the time of logical storage data "1" and lower than the threshold voltage at the time of logical storage data "0", and thereby a characteristic is obtained in which no current flows even if the voltage of the word line WL is increased. This leads to a further increase in the operation margin of the dynamic flash memory cell.

Feature 2

In the dynamic flash memory cell according to the first embodiment of the present invention, a negative voltage is applied to the source line SL at the time of erasing, but the bit line BL can be kept in a floating state without a specific DC voltage being applied thereto. As a result, no current flows from the bit line BL to the source line SL. The erase voltage $V_E A$ is applied to the source line SL and the voltage $V_{ERA}$ of the semiconductor base 7 is $V_{FB}=V_{ERA}+Vb$. Thus, the PN junction between the semiconductor base 7 of the P layer and the $N^+$ layer of the bit line BL is in a reverse bias state. Thus, for example, it is not necessary to apply the negative voltage of the erase voltage $V_{ERA}$ to the bit line BL. As a result, a circuit connected to the bit line BL, for example, a buffer circuit for protecting a sense amplifier circuit by blocking a negative voltage between the sense amplifier circuit and the bit line BL, is not necessary, and the circuit can be designed very easily. In addition, the absence of the buffer circuit makes it possible to reduce the chip area accordingly, and provide a dynamic flash memory at low cost. Furthermore, the absence of the buffer circuit enables the sense amplifier circuit to perform a high-speed sensing operation.

Feature 3

Focusing on the role of the first gate conductor layer 5a connected to the plate line PL of the dynamic flash memory cell according to the first embodiment of the present invention, the voltage of the word line WL oscillates up and down when the dynamic flash memory cell performs a write or read operation. At this time, the plate line PL functions to reduce the capacitive coupling ratio between the word line WL and the semiconductor base 7. As a result, when the voltage of the word line WL oscillates up and down, an influence of the voltage change in the semiconductor base 7 can be significantly reduced. This makes it possible to increase the difference in the threshold voltage of the SGT of the word line WL indicating the logic "0" and "1". This leads to an increase in the operation margin of the dynamic flash memory cell.

Feature 4

An existing volatile memory is incapable of fixing a bit line to the ground potential in a state in which the word line WL of the dynamic flash memory cell according to the first embodiment of the present invention is selected. In a DRAM, which is a read destructive memory, if the bit line BL is grounded while the word line WL is in a selected state, the charge stored in the capacitor of a memory cell is lost. Also in an SRAM, although the memory cell is constituted by a flip-flop circuit formed of six transistors, the memory cell current is small in the miniaturized SRAM, and thus the stored data in the flip-flop circuit is inverted if the bit line is forcibly grounded. In the dynamic flash memory cell, stored data is not destroyed even if the bit line BL is grounded in the memory cell for which the word line WL is selected, unlike in the existing volatile memory. As a result, a bit line shield technique for a volatile memory can be realized for the first time. This makes it possible to alternately select an odd-numbered bit line and an even-numbered bit line, ground one of the bit lines while the other is being read, reduce noise by the shielded bit line, and perform stable reading.

Feature 5

In writing in the dynamic flash memory cell according to the first embodiment of the present invention, in a memory cell in a "0" erase state, even if the bit line BL is grounded while the word line WL is selected, a "1" write operation does not occur. This is because, in a memory cell in a "0" erase state, even if the word line WL is selected and a write voltage is applied to the word line WL, no current flows from the drain to the source of the memory cell as long as the bit line BL is grounded, and no positive hole group is generated by an impact ionization phenomenon. In an existing nonvolatile memory, for example, in a NAND flash memory, the bit line BL is grounded and a write voltage is applied to the word line WL to perform writing to a memory cell. Thus, in the dynamic flash memory cell, even if the bit line BL is grounded in a memory cell for which the word line WL is selected and a write voltage is being applied to the word line WL, a "1" write operation does not occur from a "0" erase state, and stored data is not destroyed, unlike in an existing semiconductor memory including a nonvolatile memory. This makes it possible to alternately select an odd-numbered bit line and an even-numbered bit line, ground one of the bit lines while the other is being written, reduce noise by the shielded bit line, and perform stable writing.

Feature 6

In the dynamic flash memory cell according to the first embodiment of the present invention, introducing of the bit line shield technique makes it possible to share one sense amplifier between odd-numbered and even-numbered bit lines. As a result, the number of sense amplifier circuits of the memory array can be reduced by half, the chip size can be reduced accordingly, and an inexpensive memory device can be provided.

Feature 7

The high-speed dynamic flash memory cell of the first embodiment can be applied to a wide variety of fields. This is because the high-speed dynamic flash memory is faster than an existing DRAM, and is particularly capable of simultaneously writing or reading multiple bits at high speed. In addition, the memory cell has a small size of only $8F^2$, which is smaller by one digit than that of an existing SRAM memory cell, and it is possible to develop a memory chip or a logic chip in which large-capacity dynamic flash memory cells are mounted together.

Feature 8

The main operation modes of the high-speed dynamic flash memory cell according to the first embodiment of the present invention include three operation modes: an erase operation; a data write operation; and a data read operation. In the data write operation, "1" data writing and "0" data writing are simultaneously performed. The bit line BL is formed of a pair of complementary lines, and specifically, in a "1" data write operation, the odd-numbered bit line BLo is set to the high voltage $V_{BLH}$, and the positive hole group 9 is left in the semiconductor base 7 of the odd-numbered memory cell 201 of the selected memory cell. In a "0" data write operation, the even-numbered bit line BLe is set to the high voltage $V_{BLH}$, and the positive hole group 9 is left in the semiconductor base 7 of the even-numbered memory cell 202 of the selected memory cell. As described above, one memory cell is formed of two memory cells: the odd-numbered memory cell 201 and the even-numbered memory cell 202, and complementary data are written in the semiconductor bases 7 of these memory cells, and thereby a higher-speed read operation can be realized.

Feature 9

The dynamic flash memory cell according to the first embodiment of the present invention has, assigned thereto, a second block formed of high-speed dynamic flash memory cells of a block 35 from the controller circuit 33 during the operation. In this way, the ratio of the high-speed dynamic flash memory cells can be freely changed according to the application.

OTHER EMBODIMENTS

Although a Si pillar is formed in the present invention, a semiconductor pillar made of a semiconductor material other than Si may be used. The same applies to other embodiments according to the present invention.

Although the logical/physical conversion table in FIG. 7J and FIG. 7K of the first embodiment is provided outside the chip of the pillar-shaped semiconductor memory device, the logical/physical conversion table may be provided on the chip in the pillar-shaped semiconductor memory device. The same applies to other embodiments according to the present invention.

In addition, a timer circuit may be provided for each of the blocks BLK00 to BLK33 in FIG. 7J and FIG. 7K of the first embodiment, and each block may be refreshed in accordance with an instruction of the timer circuit. The same applies to other embodiments according to the present invention.

In a vertical NAND flash memory circuit, a plurality of memory cells are formed in the vertical direction. Each memory cell includes a semiconductor pillar serving as a channel, and a tunnel oxide layer, a charge storage layer, an interlayer insulating layer, and a control conductor layer that surround the semiconductor pillar. The semiconductor pillars at both ends of these memory cells include a source line impurity region corresponding to a source and a bit line impurity region corresponding to a drain. For one memory cell, when one of the memory cells on both sides of the one memory cell is a source, the other serves as a drain. Thus, the vertical NAND flash memory circuit is one of the SGT circuits. Thus, the present invention can also be applied to a mixed circuit with a NAND flash memory circuit.

In "1" writing, electron-hole pairs may be generated by an impact ionization phenomenon using a gate-induced drain leakage (GIDL) current described in E. Yoshida and T. Tanaka: "A Capacitorless 1T-DRAM Technology Using Gate-Induced Drain-Leakage (GIDL) Current for Low-Power and High-Speed Embedded Memory," IEEE Transactions on Electron Devices, Vol. 53, No. 4, pp. 692-697, April 2006, and the floating body FB may be filled with the generated positive hole group. The same applies to other embodiments according to the present invention.

In FIG. 1, also with a structure in which the polarities of the conductivity types of the N$^+$ layers 3a and 3b and the P layer Si pillar 2 are reversed, the dynamic flash memory operation is performed. In this case, the majority carriers are electrons in the Si pillar 2 of N-type. Thus, a group of electrons generated by impact ionization is stored in the semiconductor base 7, and a "1" state is set.

In the present invention, various embodiments and modifications can be made without departing from the broad spirit and scope of the present invention. The above-described embodiment is for explaining an example of the present invention, and does not limit the scope of the present invention. The above-described embodiment and modifications can be combined as appropriate. Furthermore, the above-described embodiment from which one or some of the constituent elements are removed as appropriate is also within the scope of the technical idea of the present invention.

According to a semiconductor memory device including a semiconductor element of the present invention, it is possible to obtain a dynamic flash memory which is a semiconductor memory device including a high-density and high-performance semiconductor element.

What is claimed is:

1. A semiconductor element memory device comprising either or both of a first block and a second block,
the first block including a plurality of first memory cells arranged in a matrix, each first memory cell being formed of one semiconductor element,
the second block including a plurality of second memory cells arranged in a matrix, each second memory cell being formed of two semiconductor elements,
each semiconductor element including:
a semiconductor base standing on a substrate in a vertical direction with respect to the substrate or extending on the substrate in a horizontal direction with respect to the substrate;
a first impurity region and a second impurity region formed, respectively, at longitudinal ends of the semiconductor base;
a gate insulating layer that is formed in contact with a side surface of the semiconductor base between the first impurity region and the second impurity region;
a first gate conductor layer formed to at least partially surround the gate insulating layer; and
a second gate conductor layer that is formed adjacent to the first gate conductor layer in contact with a side surface of the gate insulating layer, wherein
the semiconductor element memory device is configured to perform a memory write operation in which voltages are applied to the first gate conductor layer, the second gate conductor layer, the first impurity region, and the second impurity region to form a positive hole group inside the semiconductor base, by an impact ionization phenomenon or a gate-induced drain leakage current, while the semiconductor base is under a first data retention voltage,
the semiconductor element memory device is configured to perform a memory erase operation in which voltages are applied to the first impurity region, the second impurity region, the first gate conductor layer, and the second gate conductor layer to discharge the positive hole group from either or both of the first impurity region and the second impurity region, while the semiconductor base is under a second data retention voltage lower than the first data retention voltage,
the first block is configured such that the first impurity region is connected to a source line, the second impurity region is connected to an odd-numbered bit line or an even-numbered bit line in an alternating manner, one of the first gate conductor layer and the second gate conductor layer is connected to a word line, the other of the first gate conductor layer and the second gate conductor layer is connected to a first drive control line, and the semiconductor element memory device is configured to, in accordance with voltages to be applied to the source line, the bit lines, the first drive control line, and the word line, fix one of the odd-numbered bit line and the even-numbered bit line to a first voltage and read data stored in the first memory cell through the other of the odd-numbered bit line and the even-numbered bit line, and
the second block is configured such that the second memory cell includes an odd-numbered memory cell formed of a semiconductor element connected to the odd-numbered bit line and an even-numbered memory cell formed of a semiconductor element connected to the even-numbered bit line adjacent to the odd-numbered bit line.

2. The semiconductor element memory device according to claim 1, wherein data stored in each first memory cell is read to the odd-numbered bit line or the even-numbered bit line, and whether the data is write data or erase data is determined by a sense amplifier circuit in accordance with which of the odd-numbered bit line and the even-numbered bit line is a bit line to which the data has been read.

3. The semiconductor element memory device according to claim 1, wherein the first voltage is a ground voltage.

4. The semiconductor element memory device according to claim 1, wherein the odd-numbered bit line and the even-numbered bit line adjacent to the odd-numbered bit line share a single sense amplifier circuit.

5. The semiconductor element memory device according to claim 1, wherein the memory write operation of the first memory cell is performed by selecting either the odd-numbered bit line or the even-numbered bit line.

6. The semiconductor element memory device according to claim 1, wherein the memory write operation of the first memory cell is performed by fixing one of the odd-numbered bit line and the even-numbered bit line to a second voltage and selecting the other of the odd-numbered bit line and the even-numbered bit line.

7. The semiconductor element memory device according to claim 1, wherein in the memory write operation of the second memory cell, one of the semiconductor base of the odd-numbered memory cell and the semiconductor base of the even-numbered memory cell has the first data retention voltage, and the other of the semiconductor base of the odd-numbered memory cell and the semiconductor base of the even-numbered memory cell has the second data retention voltage.

8. The semiconductor element memory device according to claim 1, wherein the second memory cell has a capacity of one bit.

9. The semiconductor element memory device according to claim 1, wherein a first gate capacitance between the first gate conductor layer and the semiconductor base is larger than a second gate capacitance between the second gate conductor layer and the semiconductor base.

10. The semiconductor element memory device according to claim 1, wherein either or both of the first gate conductor layer and the second gate conductor layer are divided into two or more isolated gate conductor layers in plan view or in the vertical direction, and the isolated gate conductor layers are operated synchronously or asynchronously.

11. The semiconductor element memory device according to claim 10, wherein in the vertical direction, the isolated gate conductor layers of one of the first gate conductor layer and the second gate conductor layer are disposed on both sides of the other of the first gate conductor layer and the second gate conductor layer.

\* \* \* \* \*